United States Patent
Rowan et al.

(10) Patent No.: US 7,577,806 B2
(45) Date of Patent: Aug. 18, 2009

(54) SYSTEMS AND METHODS FOR TIME DEPENDENT DATA STORAGE AND RECOVERY

(75) Inventors: Michael T. Rowan, Amesbury, MA (US); Kevin F. Rodgers, Derry, NH (US)

(73) Assignee: Symantec Operating Corporation, Cupertino, CA (US)

( * ) Notice: Subject to any disclaimer, the term of this patent is extended or adjusted under 35 U.S.C. 154(b) by 284 days.

(21) Appl. No.: 10/668,833

(22) Filed: Sep. 23, 2003

(65) Prior Publication Data

US 2005/0066222 A1   Mar. 24, 2005

(51) Int. Cl.
*G06F 12/00* (2006.01)

(52) U.S. Cl. ............... 711/162; 711/114; 711/156; 711/161; 711/170

(58) Field of Classification Search .......... None
See application file for complete search history.

(56) References Cited

U.S. PATENT DOCUMENTS

| | | | |
|---|---|---|---|
| 3,444,528 A | 5/1969 | Lovell et al. |
| 3,533,082 A | 10/1970 | Schnabel et al. |
| 3,715,729 A | 2/1973 | Mercy |
| 4,141,066 A | 2/1979 | Keiles |
| 4,156,907 A | 5/1979 | Rawlings et al. |
| 4,164,017 A | 8/1979 | Randell et al. |
| 4,191,996 A | 3/1980 | Chesley |
| 4,351,023 A | 9/1982 | Richer |
| 4,378,588 A | 3/1983 | Katzman et al. |
| 4,403,303 A | 9/1983 | Howes et al. |
| 4,453,215 A | 6/1984 | Reid |
| 4,459,658 A | 7/1984 | Gabbe et al. |
| 4,479,214 A | 10/1984 | Ryan |
| 4,483,001 A | 11/1984 | Ryan |
| 4,484,275 A | 11/1984 | Katzman et al. |
| 4,486,826 A | 12/1984 | Wolff et al. |
| 4,498,145 A | 2/1985 | Baker et al. |
| 4,507,751 A | 3/1985 | Gawlick et al. |
| 4,521,847 A | 6/1985 | Ziehm et al. |
| 4,581,701 A | 4/1986 | Hess et al. |
| 4,607,365 A | 8/1986 | Greig et al. |
| 4,608,688 A | 8/1986 | Hansen et al. |
| 4,639,856 A | 1/1987 | Hrustich et al. |
| 4,648,031 A | 3/1987 | Jenner |

(Continued)

FOREIGN PATENT DOCUMENTS

EP   1 091 229 A2   4/2001

(Continued)

OTHER PUBLICATIONS

Daniel Gilly and the staff of O'Reilly & Associates, Inc, UNIX in a Nutshell, Aug. 1994, System V Edition, pp. 2-10 and 2-47 to 2-50.*

(Continued)

*Primary Examiner*—Matt Kim
*Assistant Examiner*—Shawn X Gu
(74) *Attorney, Agent, or Firm*—Hunton & Williams LLP

(57) ABSTRACT

A method, apparatus, and system for accessing units of storage that depends at least in part on an address of the unit of storage and the time that data was written to the unit of storage.

29 Claims, 12 Drawing Sheets

U.S. PATENT DOCUMENTS

| | | | |
|---|---|---|---|
| 4,652,940 A | 3/1987 | Sumiyoshi | |
| 4,654,819 A | 3/1987 | Stiffler et al. | |
| 4,654,857 A | 3/1987 | Samson et al. | |
| 4,674,038 A | 6/1987 | Brelsford et al. | |
| 4,703,421 A | 10/1987 | Abrant et al. | |
| 4,703,481 A | 10/1987 | Fremont | |
| 4,713,811 A | 12/1987 | Frey | |
| 4,727,516 A | 2/1988 | Yoshida et al. | |
| 4,736,339 A | 4/1988 | Crabbe, Jr. | |
| 4,750,177 A | 6/1988 | Hendrie et al. | |
| 4,754,397 A | 6/1988 | Varaiya et al. | |
| 4,814,971 A * | 3/1989 | Thatte | 714/15 |
| 4,819,154 A | 4/1989 | Stiffler et al. | |
| 4,878,167 A | 10/1989 | Kapulka et al. | |
| 4,959,774 A | 9/1990 | Davis | |
| 5,041,966 A | 8/1991 | Nakai et al. | |
| 5,089,958 A | 2/1992 | Horton et al. | |
| 5,201,044 A | 4/1993 | Frey, Jr. et al. | 395/575 |
| 5,204,958 A | 4/1993 | Cheng et al. | |
| 5,212,784 A | 5/1993 | Sparks | |
| 5,235,601 A | 8/1993 | Stallmo et al. | 371/40.1 |
| 5,241,670 A | 8/1993 | Eastridge et al. | |
| 5,255,270 A | 10/1993 | Yanai et al. | |
| 5,269,022 A | 12/1993 | Shinjo et al. | |
| 5,280,611 A | 1/1994 | Mohan et al. | 395/600 |
| 5,287,501 A | 2/1994 | Lomet | 395/600 |
| 5,297,258 A | 3/1994 | Hale et al. | |
| 5,325,519 A | 6/1994 | Long et al. | 395/575 |
| 5,327,468 A | 7/1994 | Edblad et al. | |
| 5,331,646 A | 7/1994 | Krueger et al. | |
| 5,339,406 A | 8/1994 | Carney et al. | |
| 5,357,509 A | 10/1994 | Ohizumi | |
| 5,381,545 A | 1/1995 | Baker et al. | 395/575 |
| 5,398,331 A | 3/1995 | Huang et al. | |
| 5,404,361 A | 4/1995 | Casorso et al. | |
| 5,404,508 A | 4/1995 | Konrad et al. | |
| 5,414,840 A | 5/1995 | Rengarajan et al. | |
| 5,437,026 A | 7/1995 | Borman et al. | |
| 5,440,735 A | 8/1995 | Goldring | |
| 5,446,855 A | 8/1995 | Dang et al. | |
| 5,450,546 A | 9/1995 | Krakirian | |
| 5,469,573 A | 11/1995 | McGill, III et al. | |
| 5,479,654 A | 12/1995 | Squibb | 395/600 |
| 5,483,468 A | 1/1996 | Chen et al. | |
| 5,487,160 A | 1/1996 | Bemis | |
| 5,524,205 A | 6/1996 | Lomet et al. | |
| 5,530,846 A | 6/1996 | Strong | |
| 5,535,188 A | 7/1996 | Dang et al. | |
| 5,557,770 A | 9/1996 | Bhide et al. | |
| 5,572,659 A | 11/1996 | Iwasa et al. | |
| 5,592,648 A | 1/1997 | Schultz et al. | |
| 5,598,528 A | 1/1997 | Larson et al. | |
| 5,604,853 A | 2/1997 | Nagashima | |
| 5,604,862 A | 2/1997 | Midgely et al. | |
| 5,623,598 A | 4/1997 | Voigt et al. | |
| 5,634,096 A | 5/1997 | Baylor et al. | |
| 5,638,509 A | 6/1997 | Dunphy et al. | |
| 5,640,561 A | 6/1997 | Satoh et al. | |
| 5,649,152 A | 7/1997 | Ohran et al. | |
| 5,659,747 A | 8/1997 | Nakajima | |
| 5,668,991 A | 9/1997 | Dunn et al. | |
| 5,677,952 A | 10/1997 | Blakley, III et al. | |
| 5,689,688 A | 11/1997 | Strong et al. | |
| 5,715,438 A | 2/1998 | Silha | |
| 5,717,849 A | 2/1998 | Brady | |
| 5,720,028 A | 2/1998 | Matsumoto et al. | |
| 5,724,501 A | 3/1998 | Dewey et al. | |
| 5,729,719 A | 3/1998 | Gates | |
| 5,729,743 A | 3/1998 | Squibb | 395/619 |
| 5,740,397 A | 4/1998 | Levy | |
| 5,740,433 A | 4/1998 | Carr et al. | |
| 5,742,792 A | 4/1998 | Yanai et al. | |
| 5,745,906 A | 4/1998 | Squibb | 707/203 |
| 5,751,936 A | 5/1998 | Larson et al. | |
| 5,751,939 A | 5/1998 | Stiffler | 395/182.13 |
| 5,758,057 A | 5/1998 | Baba et al. | |
| 5,761,680 A | 6/1998 | Cohen et al. | |
| 5,764,877 A | 6/1998 | Lomet et al. | 395/182.04 |
| 5,777,874 A | 7/1998 | Flood et al. | |
| 5,778,392 A | 7/1998 | Stockman et al. | |
| 5,787,243 A | 7/1998 | Stiffler | 395/182.11 |
| 5,790,773 A | 8/1998 | DeKoning et al. | 395/182.04 |
| 5,794,252 A | 8/1998 | Bailey et al. | |
| 5,799,141 A | 8/1998 | Galipeau et al. | |
| 5,802,264 A | 9/1998 | Chen et al. | |
| 5,806,065 A | 9/1998 | Lomet | |
| 5,809,340 A | 9/1998 | Bertone et al. | |
| 5,809,543 A | 9/1998 | Byers et al. | |
| 5,813,017 A | 9/1998 | Morris | 707/204 |
| 5,829,045 A | 10/1998 | Motoyama | |
| 5,829,046 A | 10/1998 | Tzelnic et al. | |
| 5,835,915 A | 11/1998 | Carr et al. | |
| 5,835,953 A | 11/1998 | Ohran | |
| 5,845,292 A | 12/1998 | Bohannon et al. | |
| 5,857,208 A | 1/1999 | Ofek | |
| 5,864,657 A | 1/1999 | Stiffler | 395/182.13 |
| 5,893,119 A | 4/1999 | Squibb | 707/203 |
| 5,893,140 A | 4/1999 | Vahalia et al. | |
| 5,907,685 A | 5/1999 | Douceur | |
| 5,933,368 A | 8/1999 | Ma et al. | |
| 5,937,428 A | 8/1999 | Jantz | |
| 5,948,110 A | 9/1999 | Hitz et al. | 714/6 |
| 5,961,613 A | 10/1999 | DeNicola | |
| 5,963,962 A | 10/1999 | Hitz et al. | |
| 5,982,886 A | 11/1999 | Itami et al. | |
| 5,996,088 A | 11/1999 | Frank et al. | |
| 6,000,020 A | 12/1999 | Chin et al. | |
| 6,012,145 A | 1/2000 | Mathers et al. | |
| 6,014,690 A | 1/2000 | Van Doren et al. | |
| 6,016,553 A | 1/2000 | Schneider et al. | 714/21 |
| 6,018,746 A | 1/2000 | Hill et al. | |
| 6,035,306 A | 3/2000 | Lowenthal et al. | |
| 6,041,420 A | 3/2000 | Skarpelos et al. | |
| 6,044,444 A | 3/2000 | Ofek | |
| 6,054,987 A | 4/2000 | Richardson | |
| 6,061,769 A | 5/2000 | Kapulka et al. | 711/162 |
| 6,061,770 A | 5/2000 | Franklin | |
| 6,064,247 A | 5/2000 | Krakirian | |
| 6,065,018 A | 5/2000 | Beier et al. | 707/202 |
| 6,078,990 A | 6/2000 | Frazier | |
| 6,079,000 A | 6/2000 | Cooper et al. | |
| 6,081,875 A | 6/2000 | Clifton et al. | 711/162 |
| 6,081,877 A | 6/2000 | Taki | |
| 6,085,200 A | 7/2000 | Hill et al. | |
| 6,122,664 A | 9/2000 | Boukobza et al. | |
| 6,125,404 A | 9/2000 | Vaglica et al. | |
| 6,131,148 A | 10/2000 | West et al. | |
| 6,138,243 A | 10/2000 | Mealey et al. | |
| 6,148,416 A | 11/2000 | Masubuchi | 714/15 |
| 6,157,991 A | 12/2000 | Arnon | |
| 6,158,019 A | 12/2000 | Squibb | 714/13 |
| 6,161,192 A | 12/2000 | Lubbers et al. | |
| 6,173,377 B1 | 1/2001 | Yanai et al. | |
| 6,181,870 B1 | 1/2001 | Okada et al. | |
| 6,189,016 B1 | 2/2001 | Cabrera et al. | |
| 6,199,178 B1 | 3/2001 | Schneider et al. | 714/21 |
| 6,205,450 B1 * | 3/2001 | Kanome | 707/203 |
| 6,205,527 B1 | 3/2001 | Goshey et al. | |
| 6,219,752 B1 * | 4/2001 | Sekido | 711/114 |
| 6,230,282 B1 | 5/2001 | Zhang | |
| 6,240,527 B1 | 5/2001 | Schneider et al. | 714/21 |
| 6,243,105 B1 | 6/2001 | Hoyer et al. | |
| 6,289,357 B1 | 9/2001 | Parker | 707/202 |
| 6,301,677 B1 | 10/2001 | Squibb | 714/13 |

| | | | | | | |
|---|---|---|---|---|---|---|
| 6,311,193 B1 * | 10/2001 | Sekido ................ 707/202 | | 7,272,666 B2 | 9/2007 | Rowan et al. |
| 6,317,815 B1 | 11/2001 | Mayer et al. | | 7,296,008 B2 | 11/2007 | Passerini et al. |
| 6,324,548 B1 | 11/2001 | Sorenson ............. 707/204 | | 7,409,587 B2 | 8/2008 | Perry |
| 6,341,341 B1 | 1/2002 | Grummon et al. | | 2001/0001151 A1 | 5/2001 | Duckwall et al. |
| 6,345,346 B1 | 2/2002 | Biessener et al. ...... 711/162 | | 2001/0013100 A1 | 8/2001 | Doblar et al. |
| 6,347,365 B1 | 2/2002 | Leshem et al. | | 2001/0056438 A1 | 12/2001 | Ito |
| 6,357,015 B1 | 3/2002 | Yamakawa et al. | | 2002/0010872 A1 | 1/2002 | Van Doren et al. |
| 6,363,487 B1 | 3/2002 | Schneider | | 2002/0023199 A1 | 2/2002 | Biessener et al. ...... 711/162 |
| 6,366,987 B1 | 4/2002 | Tzelnic et al. | | 2002/0049883 A1 | 4/2002 | Schneider et al. ...... 711/100 |
| 6,369,820 B1 | 4/2002 | Bertram et al. | | 2002/0049950 A1 | 4/2002 | Loaiza et al. ......... 714/763 |
| 6,374,363 B1 | 4/2002 | Wu et al. | | 2002/0083037 A1 | 6/2002 | Lewis et al. |
| 6,381,635 B1 | 4/2002 | Hoyer et al. | | 2002/0103982 A1 | 8/2002 | Ballard et al. |
| 6,385,707 B1 | 5/2002 | Maffezoni | | 2002/0129214 A1 | 9/2002 | Sarkar |
| 6,389,547 B1 | 5/2002 | James et al. | | 2002/0133512 A1 | 9/2002 | Milillo et al. |
| 6,430,577 B1 | 8/2002 | Hart | | 2002/0144044 A1 | 10/2002 | Moon et al. |
| 6,434,681 B1 | 8/2002 | Armangau | | 2002/0144068 A1 | 10/2002 | Ohran |
| 6,434,710 B1 | 8/2002 | Sato et al. | | 2002/0156971 A1 | 10/2002 | Jones et al. ............ 711/114 |
| 6,446,090 B1 | 9/2002 | Hart | | 2002/0161983 A1 | 10/2002 | Milos et al. |
| 6,473,775 B1 | 10/2002 | Kusters et al. | | 2002/0178283 A1 | 11/2002 | Robinson |
| 6,477,629 B1 | 11/2002 | Goshey et al. | | 2002/0199073 A1 | 12/2002 | Tamura et al. |
| 6,499,034 B1 | 12/2002 | Mackinlay | | 2003/0006988 A1 | 1/2003 | Alford, Jr. et al. |
| 6,505,248 B1 | 1/2003 | Casper et al. | | 2003/0014534 A1 | 1/2003 | Watanabe |
| 6,532,535 B1 | 3/2003 | Maffezoni | | 2003/0014605 A1 | 1/2003 | Slater et al. |
| 6,535,967 B1 | 3/2003 | Milillo et al. | | 2003/0018657 A1 | 1/2003 | Monday |
| 6,538,669 B1 | 3/2003 | Lagueux et al. | | 2003/0028726 A1 | 2/2003 | Gaertner et al. |
| 6,539,402 B1 | 3/2003 | Sorenson et al. ........ 707/202 | | 2003/0051109 A1 | 3/2003 | Cochran |
| 6,542,975 B1 | 4/2003 | Evers et al. | | 2003/0056136 A1 | 3/2003 | Aweya et al. |
| 6,549,992 B1 | 4/2003 | Armangau et al. | | 2003/0061331 A1 | 3/2003 | Nakamura et al. |
| 6,553,392 B1 | 4/2003 | Mosher, Jr. et al. | | 2003/0061456 A1 | 3/2003 | Ofek et al. |
| 6,557,089 B1 | 4/2003 | Reed et al. | | 2003/0088807 A1 | 5/2003 | Mathiske et al. |
| 6,560,614 B1 | 5/2003 | Barboy et al. | | 2003/0093444 A1 | 5/2003 | Huxoll ................ 707/204 |
| 6,581,185 B1 | 6/2003 | Hughes | | 2003/0097607 A1 | 5/2003 | Bessire |
| 6,587,962 B1 | 7/2003 | Hepner et al. | | 2003/0115432 A1 | 6/2003 | Biessener et al. ...... 711/162 |
| 6,594,744 B1 | 7/2003 | Humlicek et al. | | 2003/0126387 A1 | 7/2003 | Watanabe |
| 6,598,131 B2 | 7/2003 | Kedem et al. | | 2003/0135783 A1 | 7/2003 | Martin et al. |
| 6,611,850 B1 | 8/2003 | Shen | | 2003/0140070 A1 | 7/2003 | Kaczmarski et al. |
| 6,618,794 B1 | 9/2003 | Sicola et al. | | 2003/0140209 A1 | 7/2003 | Testardi |
| 6,622,263 B1 | 9/2003 | Stiffler et al. | | 2003/0149736 A1 | 8/2003 | Berkowitz et al. |
| 6,643,671 B2 | 11/2003 | Milillo et al. | | 2003/0167380 A1 * | 9/2003 | Green et al. ........... 711/136 |
| 6,651,075 B1 | 11/2003 | Kusters et al. | | 2003/0177321 A1 | 9/2003 | Watanabe |
| 6,654,830 B1 | 11/2003 | Taylor et al. | | 2003/0191829 A1 | 10/2003 | Masters et al. |
| 6,658,434 B1 | 12/2003 | Watanabe et al. | | 2003/0204683 A1 | 10/2003 | Okumoto et al. |
| 6,664,964 B1 | 12/2003 | Levin-Michael et al. | | 2003/0204700 A1 | 10/2003 | Biessener et al. |
| 6,665,779 B1 | 12/2003 | Polfer et al. | | 2003/0220929 A1 | 11/2003 | Tolpin et al. |
| 6,667,743 B2 | 12/2003 | Bertram et al. | | 2003/0225884 A1 | 12/2003 | Hayden |
| 6,684,229 B1 | 1/2004 | Luong et al. | | 2004/0030951 A1 * | 2/2004 | Armangau .............. 714/6 |
| 6,687,322 B1 | 2/2004 | Zhang et al. | | 2004/0078638 A1 | 4/2004 | Cochran |
| 6,691,245 B1 | 2/2004 | DeKoning | | 2004/0117572 A1 | 6/2004 | Welsh et al. |
| 6,694,413 B1 | 2/2004 | Mimatsu et al. | | 2004/0139128 A1 | 7/2004 | Becker et al. |
| 6,701,456 B1 | 3/2004 | Biessener | | 2005/0063374 A1 | 3/2005 | Rowan et al. |
| 6,704,730 B2 | 3/2004 | Moulton et al. | | 2005/0065962 A1 | 3/2005 | Rowan et al. |
| 6,711,572 B2 | 3/2004 | Zakharov et al. | | 2005/0066118 A1 | 3/2005 | Perry et al. |
| 6,711,693 B1 | 3/2004 | Golden et al. | | 2005/0066225 A1 | 3/2005 | Rowan et al. |
| 6,732,125 B1 | 5/2004 | Autrey et al. | | 2005/0076261 A1 | 4/2005 | Rowan |
| 6,732,171 B2 | 5/2004 | Hayden | | 2005/0076262 A1 | 4/2005 | Rowan |
| 6,732,293 B1 | 5/2004 | Schneider | | 2005/0076264 A1 | 4/2005 | Rowan et al. |
| 6,816,951 B2 | 11/2004 | Kimura et al. | | 2005/0251540 A1 | 11/2005 | Sim-Tang |
| 6,871,271 B2 | 3/2005 | Ohran et al. | | 2005/0262097 A1 | 11/2005 | Sim-Tang et al. |
| 6,880,058 B2 | 4/2005 | Mizuno et al. | | 2005/0262377 A1 | 11/2005 | Sim-Tang |
| 6,920,106 B1 | 7/2005 | Chou et al. | | 2006/0047895 A1 | 3/2006 | Rowan et al. |
| 6,944,188 B2 | 9/2005 | Sinha et al. | | 2006/0047902 A1 | 3/2006 | Passerini |
| 6,950,438 B1 | 9/2005 | Owen et al. | | 2006/0047903 A1 | 3/2006 | Passerini |
| 6,981,004 B2 | 12/2005 | Ganesh et al. | | 2006/0047989 A1 | 3/2006 | Delgado et al. |
| 6,981,114 B1 * | 12/2005 | Wu et al. ............... 711/162 | | 2006/0047998 A1 | 3/2006 | Darcy |
| 6,983,352 B2 | 1/2006 | Keohane et al. | | 2006/0101384 A1 | 5/2006 | Sim-Tang et al. |
| 6,985,956 B2 | 1/2006 | Luke et al. | | | | |
| 7,000,145 B2 | 2/2006 | Werner et al. | | | | |
| 7,073,025 B2 | 7/2006 | Okamoto et al. | | | FOREIGN PATENT DOCUMENTS | |
| 7,143,228 B2 | 11/2006 | Iida et al. | | EP | 0 751 462 B1 | 7/2002 |
| 7,174,479 B2 | 2/2007 | Kutan et al. | | WO | WO 91/01026 | 1/1991 |
| 7,234,033 B2 | 6/2007 | Watanabe | | WO | WO 96/12232 | 4/1996 |
| 7,236,987 B1 | 6/2007 | Faulkner et al. | | WO | WO 99/12101 | 3/1999 |
| 7,239,581 B2 | 7/2007 | Delgado et al. | | WO | WO 99/50747 | 10/1999 |

| | | |
|---|---|---|
| WO | WO 00/65447 | 11/2000 |
| WO | WO 01/04801 A1 | 1/2001 |
| WO | WO 01/33357 A1 | 5/2001 |
| WO | WO 03/007148 A1 | 1/2003 |
| WO | WO 03/088045 | 10/2003 |

OTHER PUBLICATIONS

Castelletto et al., "DB2 for VSE & VM Archiving and Recovery," IBM VSE/ESA, pp. 1, 3-9, 11-18 (1996).

Castelletto et al., "DB2 for VSE & VM Archiving and Recovery" [formerly online], (1996) [retrieved on Oct. 26, 2004]. Retrieved from the Internet:< URL: http://web.archive.org/web/19990222065151/http://www.s390.ibm.com/vse/vsehtmls/vse8arc.htm>.

"Commands for Optical Memory Block Devices." in T10, *Information Technology—SCSI-3 Block Commands* (Nov. 13, 1997) (pp. 72-73).

Flaviu, C. and Fetzer, C. *Probabilistic Internal Clock Synchronization*, California (May 1, 2003), pp. 1-33.

Green, R.J. et al., "Designing a Fast, On-line Backup System for a Log-Structured File System," Digital Technical Journal, vol. 8, No. 2, 1996, pp. 32-45.

Hultgren, C.D., "Fault-tolerant Personal Computers Safeguard Critical Applications," I&CS Instruments and Control Systems, vol. 65, No. 9, Radnor, PA, US, pp. 23-28 (Sep. 1992).

International Search Report of PCT/US98/18863; completed Feb. 2, 1999.

International Search Report of PCT/US00/10999; completed Aug. 25, 2000.

*Proven Technology and Industry Leadership* [online], (2004) [retrieved on Aug. 23, 2004]. Retrieved from the Internet:< URL: http://www.mendocinosoft.com/pages.company.html>.

*RealTime—Near-Instant Recovery to Any Point in Time* [online], (2004) [retrieved on Aug. 23, 2004]. Retrieved from the Internet:< URL: http://www.mendocinosoft.com/pages.products/htm>.

Robinson, J.T., Analysis of Steady-State Segment Storage Utilizations in a Log-Structured File System with Least-Utilized Segment Cleaning, IBM Research Division, T.J. Watson Research Center, Oct. 1996, pp. 29-32.

Rodriguez-Rivera et al., "A Non-Fragmenting Non-Moving, Garbage Collector," from Proceedings of the International Symposium on Memory Management, Vancouver, Canada, Oct. 17-19, 1998, pp. 79-85, especially Figure 3 and pp. 82-83.

Shread, P. *The Big Blackout, a Year Later*, [online], (Aug. 13, 2004) [retrieved on Aug. 23, 2004]. Retrieved from the Internet:< URL: http://www.internetnews.com/storage/article.php/3394821>.

*Time-Slider Technology Blends Recovery Point and Time Objective* [online], (2004) [retrieved on Aug. 23, 2004]. Retrieved from the Internet:< URL: http://www.mendocinosoft.com/pages/Time%Slider.htm>.

Topio, Inc., *Business Solutions: Enterprise Backup Consolidation* [pdf online], (Nov. 2003) [retrieved on Aug. 23, 2004]. Retrieved from the Internet:< URL: http://www.topio.com/product/pdf/EBC.pdf>.

Topio, Inc., *Business Solutions: Heterogeneous Disaster Recovery* [pdf online], (Nov. 2003) [retrieved on Aug. 23, 2004]. Retrieved from the Internet:< URL: http://www.topio.com/product/pdf/HDR.pdf>.

Topio, Inc., *Business Solutions: Replicated Storage Services* [pdf online], (Nov. 2003) [retrieved on Aug. 23, 2004]. Retrieved from the Internet:< URL: http://www.topio.com/product/pdf/RSS.pdf>.

Topio, Inc., *Enterprise Data Recoverability* [pdf online], (Nov. 2003) [retrieved on Aug. 23, 2004]. Retrieved from the Internet:< URL: http://www.topio.com/product/pdf/EDR.pdf>.

Topio, Inc., *Topio Corporate Summary* [pdf online], (Nov. 2003) [retrieved on Aug. 23, 2004]. Retrieved from the Internet:< URL: http://www.topio.com/product/pdf/TCS.pdf>.

Topio, Inc., *Topio Data Protection Suite: Enterprise Data Recoverability* [pdf data sheet online], (Nov. 2003) [retrieved on Aug. 23, 2004]. Retrieved from the Internet:< URL: http://www.topio.com/product/pdf/TDPS.pdf>.

Topio, Inc., *Topio Data Protection Suite: Enterprise Data Recoverability* [pdf online], (Nov. 2003) [retrieved on Aug. 23, 2004]. Retrieved from the Internet:< URL: http://www.topio.com/product/pdf/BWPI.pdf>.

Topio, Inc., *Topio Data Protection Suite: Technical Overview* [pdf online], (Nov. 2003) [retrieved on Aug. 23, 2004]. Retrieved from the Internet:< URL: http://www.topio.com/product/pdf/TTO.pdf>.

*Topio™ Delivers New Advances in Continuous Data Protection Solutions for Enterprise Disaster Recovery* [online press release], (Apr. 5, 2004) [retrieved on Aug. 23, 2004]. Retrieved from the Internet:< URL: http://www.topio.com/news/pr_04.05.04.html>.

*Topio™ to Demo Continuous Data Protection Solutions at International DB2 Users Group Show*, [online press release], (May 10, 2004) [retrieved on Aug. 23, 2004]. Retrieved from the Internet:< URL: http://www.topio.com/news/pr_05.10.04.html>.

Vyant Technologies, Inc. *RealTime™* [homepage online], (Sep. 25, 2002) [retrieved on Nov. 22, 2004]. Retrieved from the Internet:<URL: http://www.archive.org/web/20020925205451/http://vyanttech.com>.

Vyant Technologies, Inc. *RealTime™* [white paper online], (2002) [retrieved on Nov. 22, 2004]. Retrived from the Internet: <URL: http://web.archive.org/web/20030315044353/www.vyanttech.com/assets/documents/realtime_white_paper.pdf.

Wild File, Inc. *User's Guide: GoBack™ by Wild File, Version 2.1*. Minnesota. 1998.

Wild File, Inc. *User's Guide Addendum: GoBack™ by Wild File, Version 2.1d*. Minnesota. 1999.

XOSoft, Inc., *Company Overview* [online], (Jul. 23, 2003) [retrieved on Aug. 23, 2004]. Retrieved from the Internet:<URL: http://www.xosoft.com/company/index.shtml>.

XOSoft, Inc., *Data Rewinder™ Product Suite* [online], (Jul. 23, 2003) [retrieved on Aug. 23, 2004]. Retrieved from the Internet:<URL: http://www.xosoft.com/products/f_Rewinder.shtml>.

XOSoft, Inc., *WANSync Product Suite* [online], (Jul. 23, 2003) [retrieved on Aug. 23, 2004]. Retrieved from the Internet:< URL: http://www.xosoft.com/products/f_WANSync.shtml>.

XOSoft, Inc., WANSync$^{HA}$ Product Suite [online], (Dec. 2003) [retrieved on Aug. 23, 2004]. Retrieved from the Internet:< URL: http://www.xosoft.com/products/f_WANSyncHA.shtml>.

International Search Report (PCT/ISA/210) for PCT/US05/30168, mailed Dec. 9, 2005.

International Search Report (PCT/ISA/210) for PCT/US05/30166, mailed Sep. 11, 2006.

International Search Report (PCT/ISA/210) for PCT/US05/30165, mailed Oct. 20, 2006.

International Search Report (PCT/ISA/210) for PCT/US05/30167, mailed Jul. 3, 2007.

International Search Report (PCT/ISA/210) for PCT/US05/30169, mailed Nov. 5, 2007.

Mitchell Shnier, Computer Dictionary, (1998) Que Corporation, pp. 572-578.

William Stallings, Data and Computer Communications (2000), 6$^{th}$ Edition, pp. 329-338.

Qing, Y., et al., "TRAP-Array: A Disk Array Architecture Providing Timely Recovery to any Point in Time", Proceedings of the 33$^{rd}$ International Symposium on Computer Architecture (2006), pp. 289-301.

Zhou, et al. "A Block-Level Security based on Hierarchical Logical Volume of Fibre Channel RAID", pp. 574-577, (2005).

\* cited by examiner

| Byte/Bit | 7 | 6 | 5 | 4 | 3 | 2 | 1 | 0 |
|---|---|---|---|---|---|---|---|---|
| 0 | Operation Code (C0h) ||||||||
| 1 | Reserved | | | DPO | Reserved | EBP | ByteChk | RelAddr |
| 2 | Logical Block Address ||||||||
| 9 | |||||||||
| 10 | Transfer Length ||||||||
| 13 | |||||||||
| 14 | Reserved ||||||||
| 15 | |||||||||
| 16 | RelativeChk ||||||||
| 17 | Time ||||||||
| 24 | |||||||||
| 25 | Reserved ||||||||
| 30 | |||||||||
| 31 | Control ||||||||

SYSTEMS AND METHODS FOR TIME DEPENDENT DATA STORAGE AND RECOVERY

FIELD OF THE INVENTION

The invention relates to the field of data storage and, in particular, to time-dependent data storage and recovery.

BACKGROUND OF THE INVENTION

Business enterprises rely increasingly on computer systems that allow the sharing of data across a business enterprise. The data storage systems that have evolved to store large amounts of data typically are critically important to an enterprise. As a result, the disruption or failure of the data storage system can cripple operation of the entire enterprise.

Data used by applications running on computer systems are typically stored on primary storage devices (e.g., disks) and secondary storage devices (e.g., tape and cheaper disk drives) for protection. As these applications run, the data changes as a result of business operations. Information technology departments typically deal with a number of problems concerning data storage systems. Generally, however, these fall into two broad categories: hardware failure and data corruption.

The business significance of data storage systems and the importance of the integrity of the data that they store and maintain has generated a correspondingly high interest in systems that provide data protection and data recovery. At present, mirroring and snapshot technology are the two primary approaches available to enterprises interested in data recovery. In the event of a system failure, data recovery allows an enterprise to recover data from a prior point in time and to resume operations with uncorrupted data. Once the timing of the hardware failure or corrupting event, or events, is identified, recovery may be achieved by going back to a point in time when the stored data is known to be uncorrupted.

Typically, data storage devices include individual units of storage, such as cells, blocks, sectors, etc. Read commands generated by a host system (used generally to mean one or more host systems) direct the information system to provide the host with the data specified in the request. Traditionally, the information is specified based on its location within the data storage device, e.g., one or more specific blocks. Write commands are executed in a similar fashion. For example, data is written to a specific unit of storage in response to an I/O request generated by a host system. A location identifier provides direct association between the data and the unit of storage in which it is stored. Thereafter, the location identifier is employed to read and update the data.

On the hardware failure side of the data protection problem, vendors provide a few different mechanisms to help prevent hardware failure from affecting application availability and performance, for example, disk mirroring. This is a mechanism where multiple disks are grouped together to store the same information, allowing a disk to fail without preventing the application from retrieving the data. In a typical setup, the user will allocate 1-4 mirror disks for each application data disk. Each write request that is sent to the application primary disk is also sent to the mirror copies, so that the user actually has N (where N is between 2 and 5 typically) disks with the exact same data on it. As a result, the mirroring approach provides at least one complete backup of the then current data. Thus, if a disk failure occurs, the user still has application data residing on the other mirror disks. A redundant array of independent disks ("RAID") provides one example of a mirroring system.

However, mirroring is ineffective when data corruption occurs. Data corruption comes in many forms, but it generally is recognized when the user's application stops functioning properly as a result of data being written to the disk. There are many possible sources of data corruption such as a failed attempt to upgrade the application, a user accidentally deleting key information, a rogue user purposely damaging the application data, computer viruses, and the like. Regardless of the cause, mirroring actually works against the user who has experienced data corruption because mirroring replicates the bad data to all the mirrors simultaneously. Thus, all copies of the data are corrupted.

Additionally, because the disks are continuously updated, a backup of historical data, i.e., a snapshot of the data present in the data storage device at a past time T, can only be created if the system is instructed to save the backup at or prior to time T. Thus, at time T+1 the system is unable to provide a backup of the data current at time T. Further, each unit of storage is saved regardless of whether the data stored in it is unchanged since the time that the previous backup was made. Such an approach is inefficient and costly because it increases the storage capacity required to backup the data storage device at multiple points in time. Also, the mirroring approach becomes less efficient and more error prone when employed with larger data storage systems because large systems span hundreds of disks and the systems cannot assure that each disk is backed up at the same point in time. Consequently, complex and error prone processes are employed in an attempt to create a concurrent backup for the entire data storage system.

As described above, snapshots, also referred to as single point in time images, are frequently created in conjunction with a mirroring system. Alternatively, a snapshot approach may be employed as an independent data storage and recovery method. In the snapshot approach, the user selects periodic points in time when the current contents of the disk will be copied and written to either a different storage device or an allocated set of storage units within the same storage device. This approach suffers, however, from the same shortcomings as mirroring, that is, all snapshots are created at the then current point in time either in conjunction with the users request or as a result of a previously scheduled instruction to create a snapshot of the stored data. Whether alone or in combination, neither data mirrors or data snapshots allow the user to employ hindsight to recreate a data set that was current at some past time. Because the data stored in each of the storage units is not associated with an individual time identifier, a user is unable to go back to view data from a particular point in time unless coincidentally a historical backup was previously created for that time. There is no way to restore the data at an intermediate time, for example time (T-1), between the current time (T) and the time that the last backup disk was saved (for example T-2). Also, generation of single point in time images generally is a lengthy process. Image generation time has become even more significant as the storage capacity and data set sizes have increased.

The storage industry, as a result, has focused on providing both faster and more frequent image generation. Suppliers of data recovery systems that employ tapes have attempted to provide larger, more scalable tape libraries by increasing system capacities and the quantity of tape heads in order to allow parallel operation. Suppliers of disk based systems have focused on how to use disk drives to provide more single point in time images with improved response times. In one approach, one of a quantity N mirror disks is brought offline at a specified time in order to create a single point in time image at that time. The approach may allow for an increased number of images provided that the quantity of mirror disks is increased sufficiently. However, this approach significantly increases the required storage capacity with each point in time, for example, for a 5 terabyte application, 30 terabytes of storage are required to support 2 standard mirror disks and 4 point in time images. Because these solutions are only attempts at fixing existing approaches they do not provide a solution that is workable as the capacity of data storage systems continues to increase.

SUMMARY OF THE INVENTION

The present invention addresses the shortcomings of current systems by facilitating the recovery of data at any prior point in time, even when the request is made at a time following the recovery time.

In general, in one aspect, the invention relates to a storage system including a plurality (e.g. two or more) units of storage (e.g., blocks or any other unit of digital storage that are uniquely addressable). Each unit of storage stores digital data. The unit of storage can be accessed by specifying an address and a time. The dimension of time is therefore part of the access—and is specified, for example, as part of the I/O command or via a side channel. The storage system can include one or more physical storage devices on which the digital data is stored. The address can include a device identifier as well a location identifier. The device identifier can identify a logical storage device or a physical device. The time can specify that the digital data retrieved is current data from the address that is the most recent digital data written to the address at or before the time. In one embodiment, current data can be provided substantially instantaneously to a user in response to a user access request. In a version of this embodiment, the storage system includes a minimum storage capacity of two terabytes.

The capabilities of the storage system are improved when the time can either be explicitly specified or implicitly specified in the request to access the unit of storage. For example, the time may be implicitly the current time. It is particularly useful when the time can be specified either relative to another time or absolutely. For example, when the time is specified relative to another time there is no need for the host and the storage management device to have precisely synchronized clocks. In one embodiment, the time is specified relative to the current time. The time can be specified in a command to the storage system that is separate from a request to read a unit of storage. In one embodiment, the storage system creates a virtual device and the time specifies the time when the virtual device is created. In a version of this embodiment, the time is specified when the virtual device is accessed. In a version of this embodiment, new data is written to the virtual device without removing the data that was written after the time specified when the virtual device was created. This is useful in providing past images of the virtual device.

In one aspect, the invention relates to a method of accessing data stored on a storage device that is particularly suited to instantly restoring a storage device (e.g., a disk drive, a logical unit, a virtual unit, etc.) to a past time. An address and a time are specified to access the data stored on the storage device at the address at or before the time. This is particularly useful to users who are performing forensic analysis of the storage device. In one embodiment, the address includes a device identifier and a location identifier. It is particularly useful to present a virtual storage device for which the time is implicitly set to the specified time for all addresses of the virtual storage device because it allows generation of the virtual storage device substantially instantaneously. In one embodiment, data is written to the virtual storage device.

In general, in another aspect, the invention relates to an apparatus for storing data that presents one or more virtual devices that are accessed by specifying an address and a time. The apparatus includes a storage appliance that interfaces with a computer. Additionally, one or more physical storage devices interface with the storage appliance. Each storage device is controlled by the storage appliance. The storage device presents the virtual devices by providing access to the data on the virtual devices based on an address and a time.

In general, in yet another aspect, the invention relates to a data packet that corresponds to a storage device command. The data packet includes a storage device address and a time specification. The storage device address identifies the location of one or more units of storage. In one embodiment, the storage device address includes a logical block address. The time specification specifies the data that was most recently stored at the storage device address at or before the time specified in the time specification. The data packet can also include other information, including for example, a command type (e.g. read, write, etc.), a transfer length and a field that indicates whether the time field is relative or absolute. In one embodiment, the storage device command is a write command. In another embodiment, the storage device command is a read command.

In general, in another aspect, a method for providing data from a data store includes receiving a time specification. The specified time can be selected from a substantially continuous time interval, for example, the interval between a past time and the current time.

The time specification can be received in various ways, and can be in-band, that is through the same storage protocol as data requests. The time specification could be in the same packet or command as a data request. The time specification can be received out-of-band, for example via another protocol, via a user interface or command line on a console of the storage management device or other system, or some combination. The time specification can be for an absolute time or a relative time.

The method also includes receiving a request for data at an address in a first data store. The request can be any of a variety of requests, including standard storage protocol requests (e.g., a SCSI read request) and non-standard requests, such as a request that includes the time specification. The address can specify a location in the first data store, and can include a specifier for the data store, such as a logical unit number, and data store specifiers can also be provided elsewhere in the request. The address can include a logical block address. The request can include a request length indicating the size of the data requested.

The time specification and request for data can be communicated in the same packet. The packet can be in the format of an I/O command block (i.e., a data storage protocol command), such as a SCSI command.

The method includes identifying the location of data at the requested address at the specified time in response to the time specification and the data request.

In one embodiment, the location is chosen from a first time store associated with the first data store and a first current store associated with the first data store, or some combination. The identifying step can include determining whether the data at the requested address at the specified time was changed after the specified time. If data at the requested address was changed after the specified time, the identified location is the time store. If the data was not changed, the identified location is the current store.

In this embodiment, the current store stores current data, and the time store stores data previously stored in the current store that was subsequently overwritten. The time store and the current store are stored on at least one physical storage device. The physical storage device can be any of a variety of storage devices, including without limitation another storage appliance, a RAID or other device, or can be one or more hard disks, optical disks, memory, etc.

In another embodiment, the location is chosen from at least one of a first time store associated with the first data store, a first current store associated with the first data store, a second time store associated with a second data store, and a second current store associated with a second data store. This could be the case, for example, where the first data store is based on a prior image of the second data store. Likewise, the location can be chosen from additional time stores and data stores depending on the configuration. In theory, there is no limit to the number of levels that can be employed.

In separate but related aspect, a system for implementing the method above includes a first receiver module for receiving a time specification, a second receiver module for receiving a request for data at an address in a first data store, an identifier module for identifying the location of the requested data at the requested time in response to the time specification and the data request, and a reader module for reading the requested data from the identified location. The first and second receiver module can be the integrated into the same or can be different modules, and can be implemented with the system described below.

Thus, the following method can be used to identify a time at which first data was written to a first data store. A second data store is configured to respond to data requests made to the second data store with data stored in the first data store at a first time in the past. The first time can be selected from a substantially continuous time interval, typically between a past time and the current time. Preferably, the second data store is a virtual representation of the first data store at the first time, and so it can be accessed virtually instantaneously, with minimal or no data copying or movement.

The configuration can take place by using a user interface, through a command line, storage protocol command, in-band, out-of-band, etc. Thus, the configuration can include communicating the first time to the data store via the same channel by which the data requests are received, or by a different channel.

Data is requested from the second data store and received in response. It can be determined then from the received data if the first data store contained the first data at the first time. For example, the second data and the first data can be compared, or a checksum or other function of the first data and the second data can be compared.

These steps can then be repeated. For example, the second data store can be configured to respond to data requests made to the second data store with the data stored in the first data store at a second time in the past. Data is again requested from the second data store and received in response. It can be determined then from the received data if the first data store contained the first data at the second time.

As these steps are repeated each time, a system administrator can determine when data was written, by determining when it appears in a prior image (e.g., at a third time, fourth time, etc.). Because the time can be selected from a substantially continuous time interval, the time at which the data was written can be determined to the limits of the storage management device.

The data searched for can be corrupted data, for example, or it can be data sought as part of a forensic or debugging analysis. The first data store can be the same as the second data store. Likewise, a new data store can be used for each repetition, so that the first repetition configures the second data store, the next configures a third data store, the next configures a fourth data store, and so on.

Various techniques can be used to manually or automatically search for the relevant times, and various search techniques can be used. For example, the second and third times can be selected in response to the previous determinations.

As described, this can be accomplished by the storage management device continuously saving information stored in a data store before it is overwritten, for example, by the copy-on-write operation described.

In one embodiment, such a method for identifying a time at which a data was written or modified in a store (e.g., when a data store was corrupted) includes configuring a data store to respond to data requests made to the data store with the data in the data store at a first time in the past. The method includes requesting data from the data store once it is so configured, receiving data from the data store in response to the request; and determining from the received data whether the data store was corrupted at the first time. These steps can be repeated while substituting a second time (or third or fourth time and so on) for the first time, such that each repetition substitutes a respective another time for the first time.

The second time can be, for example, earlier than the first time if it was determined that the data store was corrupted, and the second time can be later than the first time if it was determined that the data store was not corrupted. Likewise, the second time can be earlier than the first time if it was determined that the data store was corrupted, and the second time is later than the first time if it was determined that the data store was not corrupted. Likewise for the third, fourth time, etc., and again these can use a search algorithm or other technique to determine the time at which corruption occurred. The number of repetitions can be the number of repetitions until a time range in which the data store was corrupted is identified, or some number more or less than that can be used.

This method can be followed by finally configuring the data store to respond to data requests made to the data store with the data in the data store during the identified time range. That is, a same or different data store can be configured to respond to requests prior to the time of corruption. Put in context of an example, if a disk volume was accidentally formatted, the time can be identified at which the formatting took place by the above method, and the disk accessed in the state that it was prior to the formatting.

In general, in another aspect, a storage management device includes a one or more I/O (data input/output) processing modules in communication with an internal network for communication among the processing modules.

Each of the I/O processing modules can include a target mode driver for communication with a host for receiving I/O requests. Each of the I/O processing modules also can include a buffer in communication with the target mode driver for storing the received I/O requests. Each of the I/O processing modules can include a data classifier in communication with the target mode driver for classifying received I/O requests and extracting control information associated with the requests.

Each of the I/O processing modules can include an I/O manager in communication with the data classifier for processing the extracted I/O control information, forwarding processed I/O control information, monitoring and indexing the flow of information within the storage management device, tracking the performance of the storage management device, and managing I/O. The I/O manager ensures that modified units of storage are saved and accessible for future reference. Each I/O manager can subscribe to process I/O for a specified plurality of units of storage.

In one embodiment, the I/O manager includes a current store controller, a time store controller, and functional storage. The I/O manager can implement optimization routines by tracking idempotent groups of control packets. The I/O manager can maintain a number of control information tables.

The I/O managers can include one or more time store controllers. The time store controllers can creates a map of all units of storage which have been overwritten in a data store since a recovery time. Thus, the I/O manager can create a region map that identifies a storage location for past data. The I/O manager can evaluate read requests to determine whether the requested units of storage were involved in a prior write operation and so implement optimizations.

Each of the I/O processing modules can also include a physical store interface in communication with the I/O manager and the buffer, the physical store interface for communicating with at least one physical store in response to the processed I/O control information.

It should be understood that there can be zero, one, two or more of these components in an I/O processing module, and there can be one, two, or more processing modules in an embodiment of a storage management device. In general, more processing modules will be used for higher performance and larger amounts of data.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is a diagram depicting an embodiment of an I/O request sent by host to a storage management device.

FIG. 7A depicts the current store. FIG. 7B depicts the time store.

DETAILED DESCRIPTION

Figure 1:
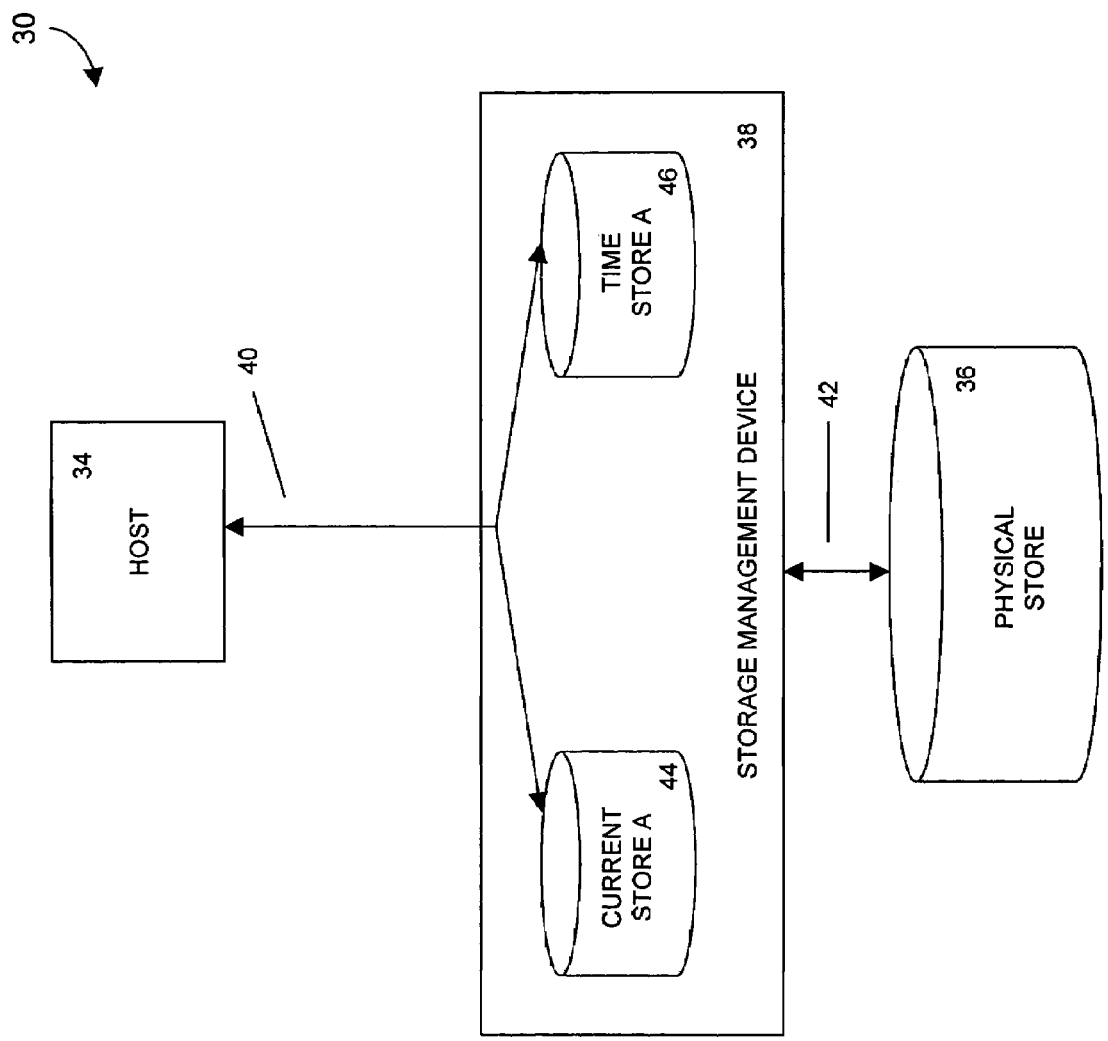
FIG. 1 is a block diagram of a storage system including a current store and a time store according to an embodiment of the invention.

FIG. 1 provides a general overview of a storage system 30 that allows for the generation of images of a data store from points in time that are prior to a request time. A host 34 communicates with a physical store 36 via a storage management device 38. In one embodiment, the physical store 36 stores digital data. In a version of this embodiment, the physical store 36 is one or more disk drives. For example, the disk drives can be magnetic disk drives, optical disk drives, or a combination of both types of disk drives. In another version of this embodiment, the physical store 36 includes one or more tape drives. The physical store 36 can be one or a combination of drives, or a storage area network. The physical store 36 can itself be a virtual drive presented by any of a variety of storage networks, appliances, or controllers. The physical store 36 can be, for example, a mirrored disk or RAID system, or other storage appliance.

The host can be any type of network or system(s) that accesses physical store 36 and/or any other form of data storage. In one embodiment, the host 34 includes a number of computers on a computer network. The host can include a storage network that is accessed by one or more users via a plurality of workstations, personal computers, or a combination of the two.

In one embodiment, the storage management device 38 itself can be a "storage appliance." It can be, for example, a separate device with processors and memory. The storage management device 38 functionality described here can also be integrated into an existing enterprise system a storage area network. In one embodiment, the storage management device 38 is implemented as a firmware layer of a storage system. A In one embodiment, the storage management device 38 uses both a current store A 44 and a time store A 46 data for a disk volume A. Although, the FIGURE shows current store A 44 and time store A 46 as located within storage the management device 38, preferably, the data associated with one or both of current store A 44 and time store A 46 is stored in the physical store 36. In such case, the storage management device 38 keeps track of the data in the current store A and the time store A in its memory, for example in the form of indexes and pointers, and reads and writes data to and from the physical store 36. The current store A 44 and the time store A 46 can be allocated separate groups units of storage in the physical store 36, for example, or their data can be intermixed on the physical store.

The current store A 44 and the time store A 46 could also be implemented in random access memory ("RAM") or other storage located in the storage management device 38. In a version of this embodiment, the current store A 44 and the time store A 46 are in different memories. Further, the media type that stores the current store A 44 can be different than the media that stores the time store A 46, e.g., the current store A 46 can be on a disk drive while the time store A 44 is on RAM. In another version, the current store A 44 and the time store A 46 comprise different sections of the same memory. In another embodiment the current store A 44 and the time store A 46 comprise physical disks, which may be the physical store 36 or otherwise. The current store A 44 and the time store A 46 can be stored on the same physical disk, or that can both be in portions of many different physical disks.

The current store A 44 stores current data and the time store A 46 stores older data from the current store A 44 that has since been replaced (i.e., overwritten) by newer data. The storage management device 38 employs information from either or both of the current store A 44 and the time store A 46 to generate and present to the host 34 current and past images of disk volume A. In one embodiment, each pair of current store A 44 and time store A 46 implements one or more logical devices. In a version of this embodiment, the storage management device 38 does not include a disk drive, but uses the physical store 36 to store the data on such virtual drives.

The storage management device 38 communicates with the host 34 over a first communication link 40. The first communication link 40 can be any sort of data communications link, such as a LAN, storage network or bus including a Fibre Channel and Small Computer Systems Interface ("SCSI"). Ethernet (e.g., Gigabit ethernet) and wireless communication are other possibilities for the first communication link 40. In one embodiment, the storage management device communicates SCSI protocol at the logical layer, and is able to communicate using one or more of a variety of physical layers, including SCSI bus, Fibre Channel, Fibre Channel 2, or iSCSI over ethernet. In response to the host 34 I/O requests, over the communication link 40, the storage management device 38 acts as if it was the physical store 36. The host's 34 I/O requests can include both read and write commands to units of storage.

The storage management device 38 communicates with the physical store 36 over a second communication link 42. The second communication link 42 can also be any sort of data communications link, such as a LAN, storage network or bus including (without limitation) Fibre Channel, Small Computer Systems Interface ("SCSI"), Integrated Drive Electronics ("IDE"), FCon, and FiCon. Ethernet (e.g., Gigabit ethernet) and wireless communication are other possibilities for the second communication link 42. In one embodiment, the physical store 36 and the second communication link 42 are implemented in a storage area network.

With primary storage systems to date, the data which is stored on the devices is indexed by an address which is made up of a device and an offset. The storage address space is divided up into blocks (e.g., sectors), where each block is 512 bytes long. When presented with an I/O request, the I/O request is sent to a specific device/disk/storage unit, and the address is known as a Logical Block Address ("LBA") and a length. In this example, the block comprises the unit of storage and the LBA indicates the unit of storage where the I/O operation begins, i.e., a specific 512-byte block that is part of the device. The length indicates how many 512-byte blocks the I/O request will operate on. For instance, in order to read 4096 bytes from a device starting at byte 8192, the LBA would be set to 16 and the length would be 8. Block sizes, less than or greater than 512 bytes can also be used, for example, a block can be 520 bytes long. Additionally, the unit of storage may be any part of the storage address space that is uniquely addressable.

In one embodiment, time is an added dimension in a second part of the address space for a given storage device. The user can request a specific LBA (and associated block span), and the user is also afforded the option of requesting a specific LBA/span combination at a specific point in time. The time is selected from a substantially continuous time interval, and doesn't have to be determined in advance. This capability can be provided at the block addressing level, and it can be applied to entire devices in order to produce a variable point in time storage.

In one embodiment, storage device management device 38 commands include an address that includes a location identifier and a time identifier. In one implementation, the location identifier can include at least one of a logical device identifier and a unit of storage with the logical device. The time identifier can be a current time or it can be a recovery time, i.e., a prior point in time for which the data stored in that unit of storage is desired. In this description, the prior time for which data is requested by the host 34 is referred to as the "recovery time." A "request time" refers to the time at which the host 34 makes a request for data from a recovery time. The units of storage of digital data can be accessed by specifying an address that includes both a location or address and a time. The storage management device 38 thus can present a continuum of "prior images" of a data store to the host 34 regardless of whether a snapshot was generated prior to the request time where each prior image is a view of the disk at the recovery time. In one embodiment, an increment that defines a minimum elapsed time between consecutive time identifiers is sufficiently small that it allows the generation of a prior data store from a substantially continuous time interval. In a version of this embodiment, requests for a current image can be responded to with data located entirely on the current store A 44 without employing any of the data from the time store A 46. However, as will be explained below in more detail, requests for data from a prior time (i.e., a prior image) can require data from both the current store A 44 and the time store A 46.

In one embodiment, each host 34 I/O request includes one or more target units of storage identified by a device identifier (e.g., a physical disk, a logical device, a virtual device, etc.), a first unit of storage (e.g., an LBA, etc.), a length, and for read commands, a time identifier. Write commands include a data payload comprising data that is being written to the target units of storage.

In another embodiment, the time identifier is implied, in the sense that a logical device is provided by the storage management device 38 that is a view of another first logical device at an earlier time. The second logical device can be established through out-of-band communication (e.g., at a console of the storage management device) or by way of in-band communication between the host 34 and the storage management device 38. In one embodiment, once the second logical device is established, units of storage associated with it can be accessed by requesting data from the second logical device rather than expressly requesting data for a specific time.

In one embodiment, the time store includes both control information, also referred to as "meta data," and payload data. In a version of this embodiment, the control information includes a time stamp that indicates when a particular unit of storage in the current store 44 was directed to be overwritten as a result of a write operation, the location in the current store 44 of the unit of storage where the data originated from, and the location in the time store 46 where the old data is now stored. The payload data that is stored in the time store 46 can include data that formerly appeared in the current store 44 but has been replaced by new data.

FIG. 2 depicts an embodiment of an I/O request, specifically, a time-based read command that can be sent by the host 34 to the storage management device 38. In one embodiment, the I/O request is a SCSI command. FIG. 2 identifies each bit included in the 31 bytes of the command block 88. In byte 0, an operation code identifies the type of command to be performed, i.e., a time-based read command. Bytes 2-9 are for the Logical Block Address that identifies a first unit of storage that the read command operates on. Bytes 10-13 are for the transfer length, which indicates the number of blocks that are being read beginning with the unit of storage (i.e., block) identified by the logical block address. Bytes 14 and 15 are reserved for future use.

Byte 16 is a RelativeChk field that indicates whether the time field is relative or absolute. If the RelativeChk field is 0, the time specified in the command block is relative to the present time; therefore, a 0 indicates that the time specified is a past time measured from the current time. For example, a recovery time of T-5000 specified at a request time T provides an example of a read command with a recovery time that is relative to current time T, i.e., the recovery time is 5000 increments of time prior to the current time. If the RelativeChk field is non-zero, the time specified is a specified absolutely, i.e., without reference to another time. For example, such an I/O request could include a relative time and the storage management device 38 could have a minimum increment of time that is one second or less. In another embodiment, the I/O request could include an absolute time and the minimum time increment could be one millisecond or less.

Bytes 17-24 include the specified read time, either relative or absolute. If the read time is absolute, the recovery time is included in bytes 17-24. If the read time is relative, the recovery time is calculated based on subtracting the specified read time from the current time. Bytes 25-30 are reserved for future use. Byte 31 is the control field of the command block 88.

In operation, data is provided to the host 34 in response to I/O requests generated by the host 34 and communicated to the storage management device 38 over the first communication link 40. To maintain a historical record of data that was stored in current store A 40 in the past, in one embodiment, the storage management device 38 employs a copy-on-write process when a host 34 I/O request directs the storage management device 38 to replace existing data with new data. Upon receipt of the host's 34 write request, the copy-on-write operation is executed by copying the existing data that is to be replaced from the current store A 44 to the time store A 46. The location in the current store A 44 from which the data is copied is referred to as the original location. The location in the time store A 46 in which the old (i.e., overwritten) data is stored is referred to as the destination location.

It may be that an actual copy of data is not performed upon the occurrence of a write operation in a particular instance, for example, because the data that will be overwritten is already saved (because it was saved with other nearby blocks, for example) or because the data is saved in memory and not written immediately. Here, copy-on-write operation can mean actual copying, but also can include such optimizations that allow for the effect of a copy-on-write. The storage management device 38 keeps track of the data that was in a unit of storage before it is overwritten, and there is sufficient information in a time store to obtain the saved data from somewhere within the storage management device 38, the physical store, and/or elsewhere after the block is overwritten. For simplicity of explanation, the examples described below generally present the operation of the storage management device 38 as if the copy-on-right were always performed, with the understanding that optimizations can be used in practice.

In one embodiment, the storage management device 38 indexes each copy-on-write and retains a record of the original location, the destination location, and a timestamp. In various embodiments, the timestamp includes the time at which the data was written to the current store A 44 or the time store A 46. In another embodiment, the timestamp includes the time that the write request was received and processed by the storage management device 38.

As a demonstrative example, the storage management device 38 can present to the host 34 a data store A. In this example, data store A is a disk volume. In one embodiment, data store A is implemented with a current store A 44 and a time store A 46. The storage management device 38 is capable of storing each change made to the volume A, and further, of providing to the host 34, a "prior image" of the volume as it existed at times in the past. As described above, the storage management device 38 can be accessed with a time specification.

Generally, because of the high volume of I/O requests found in the data management systems employed in enterprise applications, each prior image of data store A will include at least some data from time store A 46 in those applications. For example, if at present time T, host 34 requests a prior image of data store A at some time in the past T-100, the storage management device 38 will review its index and determine the units of storage on data store A that have been updated between time T-100 and the present (T). The host 34 receives data from the prior image of data store A, at time T-100, that includes the units of storage from current store A 44 that have not been updated since T-100 and, for those units of storage that have been updated since T-100, the units of storage from time store A 46 representative of the data store A at T-100.

As another example, at a current time T, host 34 requests an image of data store A from a prior time T-30. In response, the storage management device 38 generates a prior image for T-30 by employing data that exists in the current store A 44 provided that the storage unit has not been updated since the request time T-30. However, the data from current store A 44 is combined with data from time store A 46 for each record that has been updated since the request time T-30. For example, if data stored in Block 100 of current store A 44 was written once since the request time of T-30 (e.g. at time T-20), the old data that was transferred from the current store A 44 to the time store A 46 as a result of copy-on-write command that occurred at time T-20 would be found in time store A 46 at a specific address. That is, the data in time store A 46 will be indexed with its location and a timestamp indicating that it was written at time T-20. Because this is the only point in time since T-30 in which Block number 100 was written, the unit of storage identified by Block 100 and time T-20 stored in time store A 46 is the representative data of Block 100 that will be presented to host 34 when the image of data store A at time T-30 is created.

Figure 3:
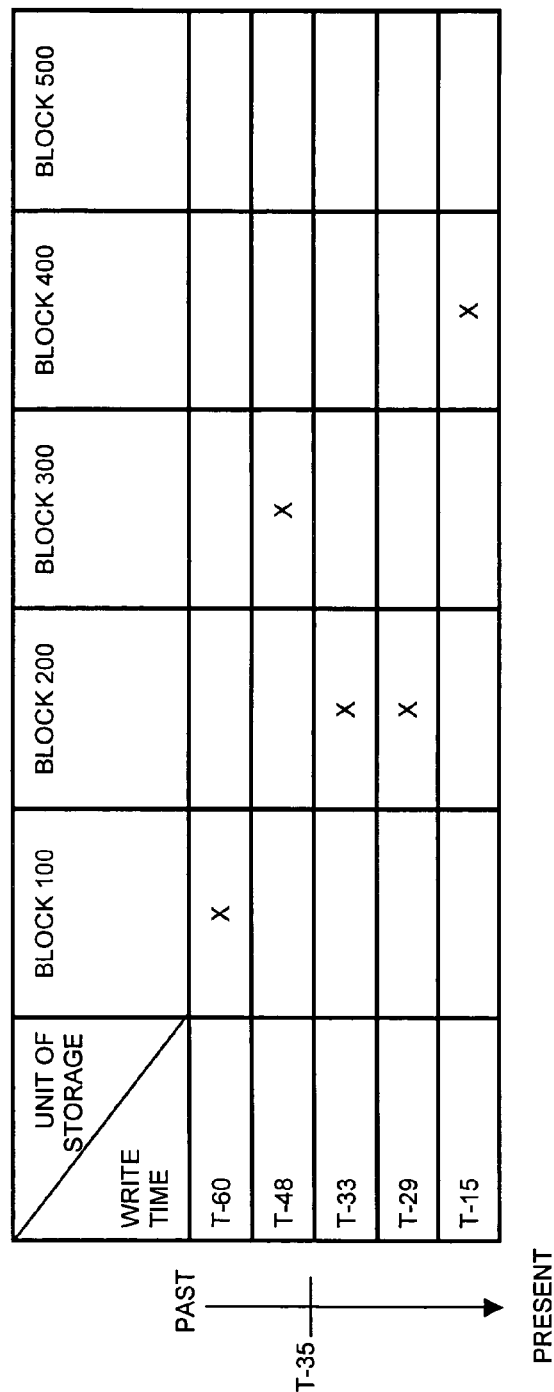
FIG. 3 is a table depicting a series of write commands directed to a data store in an embodiment of the invention.

Referring to FIG. 3, in a much-simplified illustrative example, a storage management device 38, presents a volume A that includes five units of storage, shown for simplicity as 100 byte blocks Block 100, Block 200, Block 300, Block 400 and Block 500. In this example, five updates are made to data store A between the current time T and a past time. Past write times are shown in this example, and for simplification these are identified as times T-60, T-48, T-33, T-29, and T-15. In this notation, the time T-60 is 60 units (e.g., seconds, milliseconds, microseconds) prior to time T. In an actual implementation, the units would be small increments of time, and so these numbers (i.e., 60, 48, 33, 29, 15) would likely be significantly larger.

In this example, Block 100 is updated at time T-60. Block 300 is updated at time T-48. Block 200 is updated at time T-33 and again at time T-29. Block 400 is updated at time T-15. As described above, prior to the write to Block 100, the information at Block 100 will be read and stored in the time store 46 for volume A. The same copy-on-write operation takes place for the other blocks. As a result, time store A 46 will include five records corresponding to data copied from current store A 44 prior to write requests directed to current store A 44.

In one embodiment, storage management device 38 indexes each record stored in time store A 46 with both the location of the unit of storage (e.g., Block 100, Block 200, etc.), and also a timestamp associated with the time in which the copy-on-write was performed. Thus, a prior image of data store A at time prior to T-60 can be generated by presenting data from time store A 46 for Blocks 100-400 and data in current store A 44 for Block 500, because Block 500 was not updated between prior time T-60 and present time T. Likewise, if a view of data store A (i.e., a prior image) at time T-35 is desired, three blocks can be provided by the current store A 44, i.e., Block 100, Block 300, and Block 500, because they were unchanged after time T-35. Block 200 and Block 400 were modified since time T-35, and so those blocks can be provided by the time store 46 for volume A.

Thus, as demonstrated in this simplified example, by saving in the time store 46 data that is on the volume before that data is overwritten, and also by indexing the data stored in the time store 46 by the time that it was overwritten, the system has available to it a complete current version in the current store 44, and also has an image of the data on the volume A at the time interval for which there is data in the time store 46. The storage management device 38 can present a "virtual" volume that reflects the original volume at a time in the past. Further, the storage management device 38 can provide a virtual volume from any time in the substantially continuous time interval, "Substantially" continuous because of the quantization limits defined by the minimum time increment. The virtual volume need not be generated before the request time.

In one example implementation, if the example volume is referred to as volume A, another volume, volume B, can be provided that is based on the "prior image" of volume A, that is, the contents of volume A at an earlier time. This data from volume B can be copied from the prior image of volume A onto a new volume, such that volume B then a complete copy of volume A at a prior time. Volume B can also remain "virtual" in the sense that volume B can exist merely in the form of the combination of the current store A 44 and the time store A 46, with the storage management device 38 providing the data from either the current store 44 or the time store 46 in response to accesses to volume B.

Figure 4:
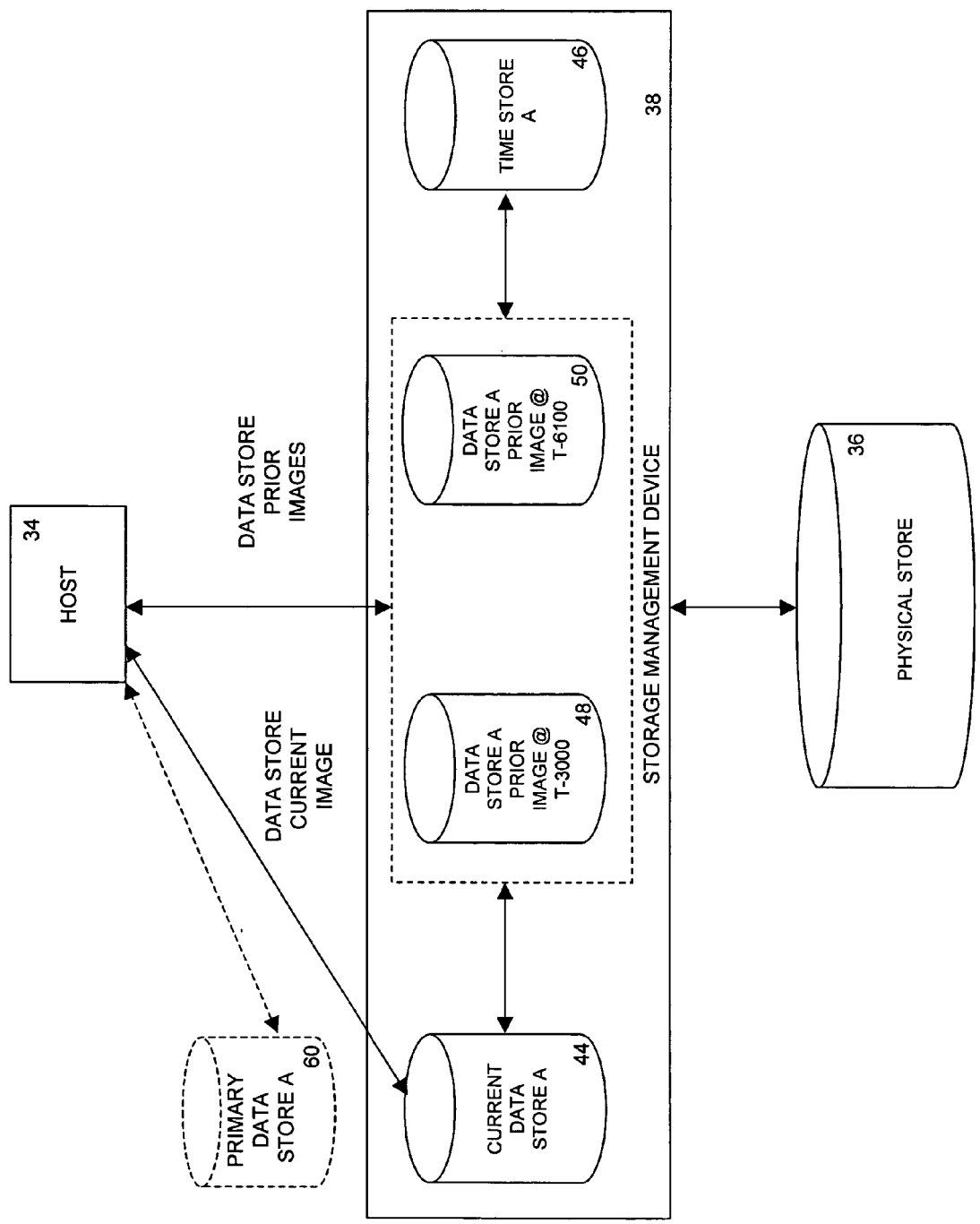
FIG. 4 is a block diagram depicting the generation of multiple prior images of a data store according to an embodiment of the invention.

Referring to FIG. 4, it is possible, for example, to provide both the current image of volume A, a prior image of volume A at one time (e.g., time T-3000) and a prior image of volume A at another time (e.g., time T-6100). Because these prior images are "virtual," the storage management device 38 can provide both virtual prior images 48, 50 simultaneously.

The host 34 and the storage management device 38 can use one or more of a variety protocols to refer to prior images of a data store. For example, the host 34 can request in an out-of-band communication that the storage management device 38 make available a virtual data store that is a prior image of another volume. The host 34 can request in an in-band communication, for example using the existing protocol or an extension to the existing protocol that the storage management device 38 make a new volume available. A system administrator can also operate a console or control panel of the storage management device 38, or otherwise provide input to the storage management device 38 to direct the storage management device 38 to make a volume available that is a virtual image of another volume. In some implementations, the new volume can be assigned a volume or device identifier (e.g., a SCSI ID, or a Fibre Channel world wide name).

Thus, in one embodiment, the storage management device receives a request to create a virtual data store that reflects the state of an original data store at a specified time. The virtual data store, can be for example, a new logical unit. The specified time can be selected from a substantially continuous time interval between a past time and the current time. The size of the interval (and the value of the past time) is a function of the size of the time store and the amount of changes directed to the data store. The virtual data store, because it is virtual, it can be provided substantially instantaneously, with minimal or no data movement.

The storage management device receives a storage protocol request for data at a specified address in the virtual data store and transmits, in response to the storage protocol request, data stored in the original data store at the specified address at the specified time.

The request to create a new virtual data store can take the form of some manipulation of a user interface. The user interface can be on one or more host systems, and communicate to the storage management device, and/or the user interface can be on a console for the storage management device. The request can be communicated via a variety of networking technologies and protocols, and/or via a storage protocol, for example, the same protocol over which the request for data is made. The request can even be part of the same storage protocol packet as the request for data. A request for data from a time in the past can even trigger automatically the provision of a virtual data store.

The request for data can be a standard read request, for example via a storage protcol, such as a SCSI read request. The request can specify an address, which can include a logical unit identifier, and a location identifier. The address can include the identifier for the virtual data store.

The original data store can itself be a virtual data store, as described here. There can be a chain of virtual data stores, each formed from a prior image of other data stores.

As described, because it is virtual, the virtual data store can be provided substantially instantaneously, with minimal or no data movement. It is possible, however, if there will be sustained use of the virtual data store, to copy the data from the virtual data store, for example, in the background, to another data store, and thereby make a complete copy of the virtual data store. Once the copy is complete, the copy can be used instead of the virtual data store. In this way the prior image can be provided by the virtual data store substantially instantaneously, with the time-consuming copying of data from one data store to another being essentially transparent to users of the storage management device.

In another embodiment, the host 34 can communicate with the storage management device 38 using a protocol that allows the host 34 to access a unit of storage by referring to the an address an a time. Thus, the dimension of time is added to the access request. The time can be referred to in a number of ways. For example, the host 34 can refer to absolute time as it kept by it or by the storage management device 38, for example, 4:07.33 on a particular day. The time can also be referred to relatively, that is, it can be specified as a time relative to another time. In one embodiment, the time is referred to based on a number of time units to be subtracted from (thus, relative to) the current time. This approach eliminates the need for the host 34 and the storage management device 38 to have a precisely synchronized clocks. Time can be referred to using any applicable units and can be any applicable units, including without limitation nanoseconds, microseconds, milliseconds, seconds, etc.

Thus, in one approach, the host 34 (or the system administrator) could first direct that a new virtual volume be created, volume B, that is a prior image of volume A, at time T-3000. The host 34 (or the system administrator) could then direct that a new virtual volume be created, volume C, that is a prior image of volume A, but at time T-6100. Thus the host can compare the actual data on volumes A, B, and C as necessary to determine what files or records, etc. on the volumes differ, for example, for forensic purposes, etc.

In another approach (that can be used in addition to or instead) the host 34 could make a request of a volume with a request that includes a specification of time in addition to the address of the data. The storage management device 38 can respond to the request by providing the data at the specified address at the specified time.

It should be noted also that in some implementations, current store A 44 can be a mirror disk of a disk 60 that is shown in phantom, or used in any other configuration as would one or more actual volumes.

The time images can also be either fixed or dynamic. A fixed time image, also referred to as a clone is similar to a snapshot of data store A at a specific point in time. It is referred to as a fixed because it is not updated, i.e., once it is created no data is written to it. A fixed image generated by storage management device 38 can differ from a snapshot, however, because the image can be generated for the first time at a request time that is later than the recovery time, i.e., the storage management device 38 re-creates an image that may not have previously existed at any time since the recovery time. In contrast, a snapshot is a duplicate that is generated at the then current time.

A dynamic time image is created as an image of current store A at a specific point in time. However, unlike a fixed time image, once generated, a dynamic time image is continually updated in the same manner as current store A. As a result, the contents of a dynamic time image are the same as current store A 44 up until the recovery time. For example, if first prior image 48 is dynamic, it will match current store A up until T-3000. Thereafter, beginning at the present request time (T), updates to current store A are replicated on first prior image 48. The resulting dynamic time image functions as a current store B which includes the results of all I/O requests directed to current store A 44 except for those occurring between request time (T) and recovery time (T-30). Accordingly, current store B also has a time store, i.e., time store B, associated with it.

Figure 5:
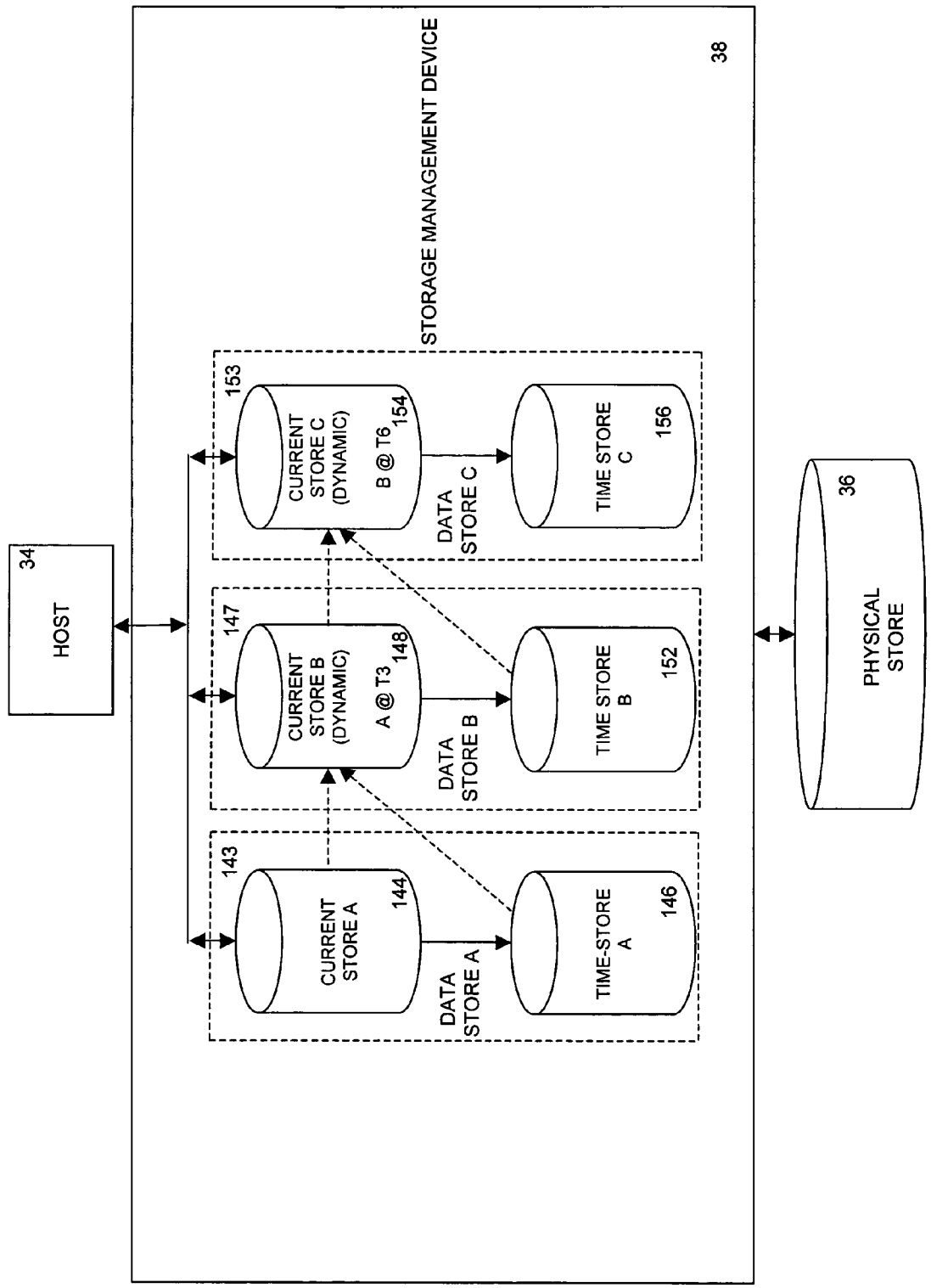
FIG. 5 is a block diagram depicting the generation dynamic current stores according to an embodiment of the invention.

Referring to FIG. 5, fixed and dynamic time images are shown. A fixed prior image is a view of a data store at a specific point in time. It is fixed in the sense that it is not updated—for example, it can be read only. In one embodiment, a time image is fixed by identifying it as a read only image at the time the image is created. A fixed image can be useful for looking at a data store at a particular time, for forensic purposes (i.e., to identify the cause of a problem), or to recover erased data. A dynamic image starts as a view of a first data store (e.g., data store A) at a particular point in time, but the prior image can be modified. The dynamic image can appear to the host as if it were a new data store onto which a prior image were copied. A dynamic image can be useful for quick recovery from a failure.

For example, upon failure due to corruption of data in a first data store, fixed prior images can be specified (as described above) that each present the data in the first data store as it existed at a specified time in the past. These prior images can be inspected to determine the approximate time of the corruption. As the minimum time stamp increment is decreased, the approximate time can be determined with increased precision. In one embodiment, a prior image that presents data from just before the time of corruption is specified to be dynamic, the software applications that use the data in the data store begin to use the prior image instead, and business activity resumes using the most recent uncorrupted version of the first data store. The applications can use the image, for example, by reconfiguring the business applications in some way, or by directing the storage management device 38 to present the dynamic prior image in the place of the first current data store, i.e., by using the prior image to create a second data store (e.g., data store B). In one embodiment, a dynamic image appears to the host as a new data store (e.g., a new device with a target identifier).

In one embodiment, the storage management device 38 provides a dynamic image without copying (or without initially copying) the prior image to another data store. Rather, the storage management device, as described above, provides the prior image of the first data store by using the current store and the time store associated with the first data store, as appropriate. The storage management device also associates a second current store and second time store with the dynamic image (i.e., the second data store), such that the changes to the dynamic image are stored in the second current store, and the changed blocks are stored (e.g., in copy-on-write fashion) in the second time store.

In one embodiment of such an implementation, the storage management device 38, upon receiving a request for current data in the dynamic image, will check first for data in the second current store, and then for data in the first time store, and lastly, for data in the current store. Upon a write request to the dynamic image, the storage management device 38 determines the location for the data currently in the dynamic image (i.e., the second current store, the original current store, or the original time store), stores the block that was "overwritten" in the second time store and then writes the new block to the second current store. A request for data from a prior image of the dynamic image can be provided using the second time store, the second current store, the first time store, and the first current store.

In another embodiment, the dynamic images are stored entirely in the time store. In this embodiment, a data store has a single current store and a single time store. In a version of this embodiment, fixed images, dynamic images, indexing information, and control blocks are stored in the time store. Dynamic images can be created by writing data located in the data store at a specified recovery time to a section of the time store. In a further version of this embodiment, a copy-on-write operation is not performed when dynamic images are written to.

Because the storage management device 38 (at least initially) can provide the dynamic image as a "virtual" device, in the sense that the data in the dynamic image is a combination of the data in the first and second current data stores and the first and second time stores, the dynamic image can be provided very quickly, and without copying of data from one data store to another. Once a dynamic image is up and running, it can be useful to (as storage management device capacity allows) copy the contents of the first current store and/or the first time store to the second current store and second time store for the dynamic image. In other words, the "virtual" second data store can be used to create a new data store that can be used to independently replace the first data store. This can be accomplished in the background, or at a time when storage management device transaction activity is relatively low. In addition, the background copy operation can be initiated either manually or automatically. In one embodiment, either the host 34 or a system administrator can initiate the background copy operation and data store replacement operation.

Referring to FIG. 5, as a simplified demonstrative example of this embodiment, suppose that a dynamic image is created of a first data store, referred to in this example as data store A 143. The prior image upon which the dynamic image is based is specified to be data store A 143 at (again, as an example) at a particular time (e.g., 11:00 a.m.). The prior image of data store A 143 is provided using the current store A 144 and the time store A 146 associated with data store A 143. Upon indication by the host 34 or the system administrator that the prior image should be dynamic (and therefore allow modification), the second data store is assigned an identifier, which in this example is data store B, and a current store B 148 and a time store B 152 are allocated to the dynamic image.

The storage management device 38 responds to a read request to data store B at the current time by checking first the current store B 148, and if the requested block is not in the current store B, then the time store A 146 and current store A 144 can be used to obtain the block as it was at the time of the prior image that was the basis for the dynamic image. To use data from a prior image of data store A 143, an index of the data store A 143 is checked to determine whether current store A 144 or time store A 146 contains the desired block.

The storage management device 38 responds to a write request to data store B (for the current time) by locating the current content of the target block as just described for the read request (e.g., checking first the current store B 148, then the time store A 146, then the current store A 144), reading the target block, and then writing the data read to the time store B 152 to complete a copy-on-write operation. The data associated with the write request for the target block is written to current store B.

A read request to data store B for a time in the past can be responded to by checking first the time store B 152. An index of the time store B 152, for example, can be checked to determine whether it contains the desired block. If not, then current store B 148 is checked, and if the block is not in the current store B, then the time store A 146 and current store A 144 are used to obtain the block as it was at the time of the prior image that was the basis for the dynamic image. That is, an index of the time store A 146 is checked to determine whether it contains the desired block for the desired time, and if not, the block in current store A 144 is used. It should be understood that the order in which the index of time store A 146 and current store A 144 are checked may be reversed. Alternatively, a composite index of time store A 146 and current store A 144 may be employed.

It should be noted that data store A 143 can continue to be an active data store and there can be continued transactions to data store A 143, but those later changes will not be reflected in data store B 147, because the storage management device 38 will continue, for accesses to data store B 147, accessing the data store A 143 at a specific past time (i.e., the prior image), and blocks later changed in the current store A 144 will be saved in the time store A 146, and so will not be lost. Practically, the size of the past time interval that can be captured by the time store will depend on the frequency of write operations directed to data store A 143 and the size of the time store A 146. Depending on the specific implementation, it therefore may be beneficial, at some time after beginning use of a dynamic image, to copy the prior image that is the basis for the dynamic image, such as the data store A at 11:00 a.m. in the example above, to another data store, or to the time store B 152 and the current store B 148. As mentioned, this transfer can be accomplished in the background while the storage management device 38 is operating normally.

In one embodiment, the transfer of the prior image blocks to current store B 148 for a specified recovery time is accomplished by the following. A block is copied from current store A 144 if the block in current store A 144 has not been overwritten since the recovery time (i.e., if the block in current store A 144 is not different from the prior image that is the basis for data store B 147) and if the block is not already included in current store B 148 (i.e., if the block was not already "overwritten" in the dynamic image since the time the dynamic image was created). A block is copied from time store A 146 to current store B 148 if it represents the data appearing in the block of data store A 143 at the recovery time, and if the block is not already found in current store B 148 (i.e., the block was not already "overwritten" in the dynamic image). Optionally, blocks in the time store A 146 from a time before the prior image can also be copied from the time store A 146 to the time store B 152, so that the data store B 147 can respond to requests for data for a time before the prior image.

Dynamic images (e.g., a third data store) can be created based on other existing dynamic images (e.g., data store B), such that the data in the third data store is provided from other current stores and time stores (e.g., from data store A and data store B). Such a dynamic image also can be generated without copying (or without initially copying) the prior image to another data store.

For example, the storage management device 38, as described above, can provide the prior image of a dynamic data store (e.g., data store B) by using the original current store (e.g., current store A), original time store (e.g., time store A), second current store (e.g., current store B), and second time store (e.g., time store B), as described in the above example. If this new prior image is specified to be dynamic, the storage management device 38 can associate a third current store and third time store with the new dynamic image (e.g., third data store), such that the changes to the new dynamic image are stored in the third current store, and changed blocks of the third data store are stored (e.g., by copy-on-write operation) in the third time store.

Using the above example, the system administrator, can, upon detection of data corruption in data store B 147, again use a number of prior images to identify the approximate (or even the exact) time of data corruption. The system administrator can then identify a prior image of data store B 147 that is of a time that is before the corruption. As an example, we say this image was at 1 p.m. The system administrator can specify that the image of data store B at 1 p.m. is a dynamic image, and this new dynamic image will be called data store C. Data store C 153 is allocated a current store C 154 and a time store C 156.

Upon receiving a request for current data in the data store C 153, the storage management device will check first for data in current store C 154, and then for data in current store B 148 and time store B 152 for the time at which the dynamic image was created. If the data block is not in current store B 148 or time store B 152 as appropriate, the storage management device 38 will obtain the data from time store A 146 or current store A 144.

Upon a write request to data store C 153, the storage management device 38 determines the location for the data currently in the dynamic image (i.e., current store C 154, current store B 148, time store B 152, current store A 144 and time store A 146), stores the block that was "overwritten" in time store C 156, and then writes the new block to current store C 154. A request for data from a prior image of the dynamic image can be provided using time store C 156, and the current store C 154 in appropriate combination with current store B 148, time store B 152, current store A 144, and time store A 146.

Figure 6:
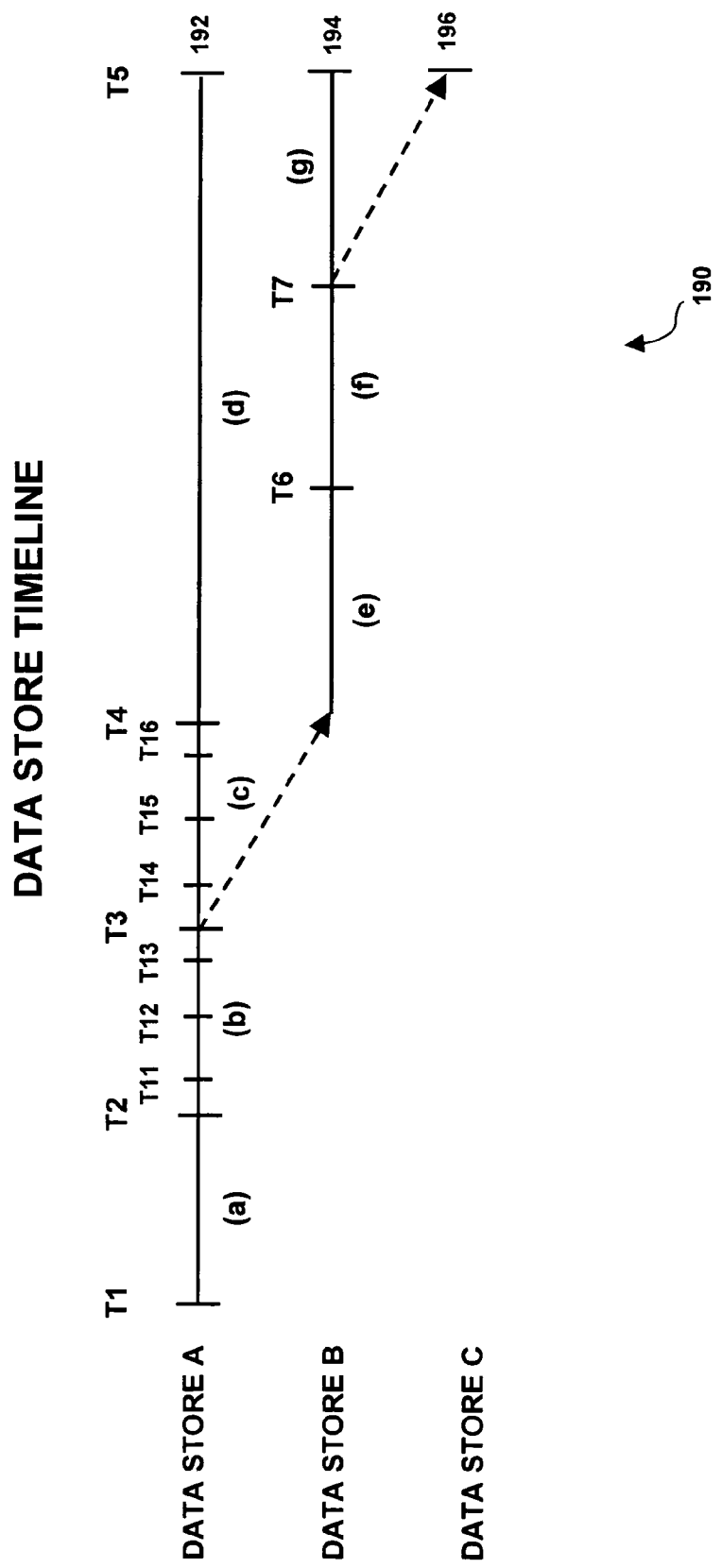
FIG. 6 is a timeline depicting the generation of a recovery data store.

Referring to FIG. 6, in another example, presented as a timeline 190, the top most horizontal line represents data store A from a first time T1 to a later time T5, i.e., time line 192. A host 34 directs I/O requests to the data stores throughout the time period T1 to T5. Data store A is used first, and in this example, an application directs read and write transactions to data store A.

At time T3, the system administrator recognizes that there has been corruption in the data store A 143, likely caused by a corruption event. The system administrator implements a review of prior images of data store A 143 to determine the time that the data corruption occurred, by identifying a recent time that the data was not corrupted. In other words, the corruption event likely occurred at the earliest time that corrupted data appears. The storage management device 38 can be employed to implement a search of arbitrary past versions of data store A 143 so that the time of the corrupting event can be determined. The degree of precision at which the corrupting event can be is at least in part determined by the minimum time stamp increment.

The validity of the data in data store A 143 is checked in a first search conducted to identify the time of the corrupting event. The first set of vertical lines appearing on time line 192 between T3 and T4 provide a simplified example of points in time (i.e., T14, T15 and T16) that a search was conducted. They represent a search from time T4 when the fact that corruption is first recognized back to time to T3. A system administrator, for example, begins the search at time T4 and reviews the data at a first search time T16. The data at time T16 is corrupted, so the system administrator reviews data from an earlier point in time, i.e. time T15 and T14. The data at time T15 and T14 is corrupted, so the search continues with review of time T11. The data at time T11 is not corrupted, and so the administrator checks time T12, time T13, and time T3. The search continues in this manner until the identification of the most recent time for which valid data exists, which in this example is time T3.

The search may also be is conducted using a variety of search methodologies. For example, larger time increments between the first and second searches might be used in an effort to more rapidly determine the time of the corrupting event. Also, the search need not begin from the point in time that the corruption is discovered. For example, the search can begin at an earlier point in time if the system administrator has an idea of the approximate time of the corrupting event. The search may also begin at a time that is earlier than the corrupting event, e.g., T1, T2, etc. For a search with a first search time at time T2, for example, the search would proceed to later points in time until the first time where corrupted data is found. It should be understood that any search strategy can be employed because the storage management device 38 is capable of providing any version of the data store A 143 that is within the interval covered by the time store A 146, to the precision of the minimum time stamp increment. In one implementation, the time precision is one millisecond.

In this example, time T3 is specified as the recovery time because it was a desired point in time identified because the corruption did not exist. Of course, the user could have selected an even earlier point in time, prior to T3, as the recovery time. A second data store, data store B 147, is established using the data from data store A at time T3. Recall that at time T4, the user identified time T3 as the most recent point in time for which valid data exists for data store A 143. At time T4 (i.e., the request time), the user creates data store B 147 as a prior image of the first data store, data store A 143, at time T3 (i.e., the recovery time). In FIG. 6, timeline 194 is associated with data store B 147.

Data store B 147 is a dynamic image; therefore, a second current store (current store B) 148 and a second time store (time store B) 152 are associated with data store B 147. Once current store B 148 is created, the storage management device 38 can make data store B 147 available to the host 34, and the application can use data store B 147 in place of data store A 143. Thereafter, host 34 I/O requests can be directed to data store B 147 instead of data store A 143. In this example, I/O requests continue to be directed to data store A 143 and data store B 147 between time T4 and time T5. In another embodiment, data store B 147 is a dynamic image comprised of a second current store that is not associated with a second time store. In a version of this embodiment, current store B 148 is implemented in a write pool whereby a write command directed to data store B 147 results in the newly written data replacing existing data in current store B 148, i.e., a record of the old data in the current store B 148 is not retained.

As described previously, data store B 147 can be created without copying the contents of data store A 143. Data store B 147 therefore can be created virtually immediately, and it can be brought on-line quickly. The data initially associated with data store B 147 resides in current store A 144 and time store A 146.

Upon receiving a read request for data store B 147 at the current time, the storage management device 38 determines which of current store A 144 and time store A 146 has the data for the block that is being read. Data in current store A 144 will be used for all data that has not been written to since time T3 and data in time store A 146 will be used for all blocks in current store A 144 that were overwritten after time T3. Once some data has be written to current store B 148, a response to a read command directed to data store B 147 at the current time might come from current store B 147, current store A 144, or time store A 146. Upon receiving a read request, storage management device 38, determines which of current store B 148, current store A 144, and time store A 146, has the data for the block that is being read. The storage management device 38 will use data in current store B 148 for all requests for blocks in data store B 147 that were written after time T4, i.e., timeline segments (e), (f), and (g). Data in current store A 144 will be used for all blocks of data that have not been written to since time T3 (timeline segments (a) and (b)), and data in time store A 146 will be used for all blocks of data on data store A 143 that have been written to between times T3 and T4 (timeline segment (c)).

Data store A 143 can continue in a dynamic state after time T4, however, changes that occur to data store A 143 after T4 will affect only the location of the data used to respond to requests for blocks in data store B 147. Such changes will not affect the actual contents of data store B 147. The source of data for block 100 of data store B 147 is a corresponding block in current store A 144 if, for example, the corresponding block 100 of data store A 143 has not been overwritten since time T3. However, the source of data for block 100 of data store B 147 is a corresponding block in time store A 146 if the corresponding block 100 was overwritten in current store A 144 since time T3, e.g., a copy-on-write command was executed on the corresponding block in data store A 143. Of course, the immediately preceding description assumes that block 100 has not yet been the target of a write command since the creation of data store B 147. Additionally, where data store A 143 is dynamic, data written to data store A 143 following time T4 is processed with copy-on-write operations such that time store A 146 continues to be employed after time T4 to save newly-overwritten data.

When a write request is directed to data store B 147, the storage management device 38 determines where the data currently in data store B 147 is located (i.e., current store B 148, current store A 144, or time store A 146). The location of the data will be the following:

1) in current store B 148 if the block in current store B 148 has been overwritten since time T4;

2) in current store A 144 if the block in current store A 144 has not had data written to it since time T4; and 3) in time store A 146 if the block was overwritten anytime after time T3.

It then follows that:

1) If the data is located in current store B 148, the existing data will be read from current store B 148 and written to time store B 152. (e.g., copy-on-write). The new data will be written to current store B 148. In one embodiment, updates to current store B 148 are accomplished without using a copy-on-write operation or a time store B 152. In a version of this embodiment, old data is not saved when write commands are directed to current store B 148.

2) If the data is located in current store A 144, the existing data from current store A 144 will be copied and written to time store B 152 without overwriting the existing data in current store A 144. The new data will be written to current store B 148.

3) If the data is located in time store A 146, the existing data from time store A 146 will be copied and written to time store B 152 without overwriting the existing data in time store A 146. The new data will be written to current store B 148.

Upon a read request for data store B 147 for the current time, the storage management device 38 determines the location for the data currently in the dynamic image by checking for data in current store B 148, current store A 144 and time store A 146. The storage management device 38 will use data in current store B 148 for all blocks of data store B 147 that are written to after time T4, i.e., timeline segments (e), (f), and (g). Data in current store A 144 will be used for all blocks of data that have not been written to since time T3 (i.e., timeline segments (a) and (b)), and data in time store A 146 will be used for all blocks of data on data store A 143 that have been written to (in data store A 143) between times T3 and T4 (timeline segment (c)).

Any number of additional data stores may also be generated based upon a current or prior image of data store A 143. For example, an image of data store A 143 at time T2 can be created at any time beginning with time T2, e.g., a data store D can be created at time T3. Creation of additional data stores can be performed sequentially with, in parallel with, or independently of the creation of the other data stores that are based on data store A 143. In each case, the contents of the additional data stores appear to be independent of the contents of the other data stores, i.e., at the creation of a data store its contents depend upon the contents of data store A 143. Thereafter, read and write commands directed to the additional data stores are responded to with data from current store A 144, time store A 146, and/or the additional data store that the command is directed to.

In one embodiment, the storage management device 38 implements an instant restore that allows a user (e.g., a host or system administrator) to generate a prior image of a data store substantially instantaneously. For example, as is described in greater detail herein, the architecture of the storage management device 38 provides detailed indexing of the write commands that are directed to each data store so that the appropriate data for each block of the data store at any time can be rapidly identified and accessed.

The instant restore can be performed in more than one manner. For example, an instant restore occurring at time T4 can be a non-destructive restore of data store A 143 for a desired recovery time of time T3. In one embodiment, the non-destructive restore is implemented by copying back into current store A 144 the results of write operations performed between times T3 and T4. In a version of this embodiment, a copy-on-write operation is performed on each block of data store A 143 that was written to from time T3 to time T4. At the recovery time, data that was current at time T3 for that block is written to each of the corresponding blocks of data store A 143. The data in the current store that is overwritten is copied to time store A 146. As described herein, the relevant details regarding the data written with a copy-on-write operation are indexed by the storage management device 38. As a result, it is possible to later recover and review the operations that were performed on data store A 143 between T3 and T4.

Because non-destructive instant restore operations increase the amount of data that must be stored in the time store, the storage management device 38 can also implement a compact recovery. In a compact recovery, some selected data is not retained following the recovery. In a version of this embodiment, a write operation, not a copy-on-write operation, is performed on the blocks of data store A 143 that were updated between T3 and T4. As a result, at the recovery time, data that was current at time T3 is written to each of the corresponding blocks of data store A 143 that were updated between T3 and T4. In another version of this embodiment, a copy-on-write operation is performed, but the data retained for the period between T3 and T4 is placed at the front of the queue of data that will be overwritten should the time store reach its storage capacity. For example, the data from the period T3 and T4 can be associated with the earliest portion of the time line so that it will be the first to be replaced when the specified storage capacity for the data store is reached.

FIG. 6 also depicts the creation of a third data store (i.e., data store C) generated from the contents of data store B 147, i.e., data store C 153 is generated from a previously created dynamic image. Here the request time is T5 and the recovery time is T7. Once again, the recovery time can be a time before corruption occurred. The operation that creates data store C 153 from data store B 147 is referred to as "stacking" because it creates a series of virtual data stores where each data store is based upon a prior image of another data store (or data stores).

In this example, data store C 153 is based upon a prior image of data store B 147 and data store B 147 is based upon a prior image of data store A 143. As a result, data store C 153 can initially be provided from data stored in any of current store B 148, time store B 152, current store A 144 and time store A 146. The storage management device 38 can present an image of data store C 153 to the host 34 based upon the following resources: 1) current store B 148 will be used for data from blocks that were overwritten between times T4 and T7 (timeline segments (e) and (f)); 2) time store B 152 will be used for data from blocks that have been overwritten since time T6 (timeline segment (g)); 3) current store A 144 will be used for data from blocks that have not been overwritten since time T3 (time line segments (a) and (b)); and 4) time store A 146 will be used for data from blocks that have been overwritten between times T1 and T3 (timeline segments (c)).

Current store C 154 and time store C 156 are allocated as described above. Read and write requests directed to data store C 153 are processed by storage management device 38 in a similar manner to the process described for data store B 147. One difference, however, is that, in order to locate the contents of data store C 153, the quantity of data stores that must be searched has increased to include current store A 144, time store A 146, current store B 148, and time store B 152. The process of creating a dynamic image from prior data store images can be extended as required by the application within the storage capacity of the system. For example, a dynamic image can be created from a prior image of data store C 153 to create a fourth data store, e.g., data store D. Additionally, the preceding approach can be employed to create a static image from a prior image of any data store, e.g., creation of a clone of data store A 143 at time T3, etc.

Figure 7A:
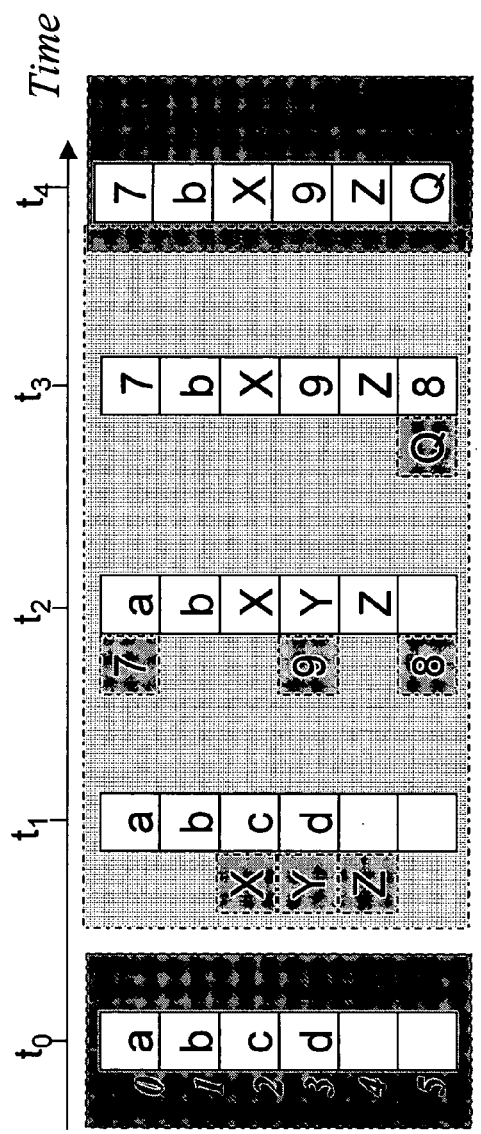
FIGS. 7A and 7B are tables depicting the contents of a current store and a time store during a series of write commands directed to the current store.
Figure 7B:
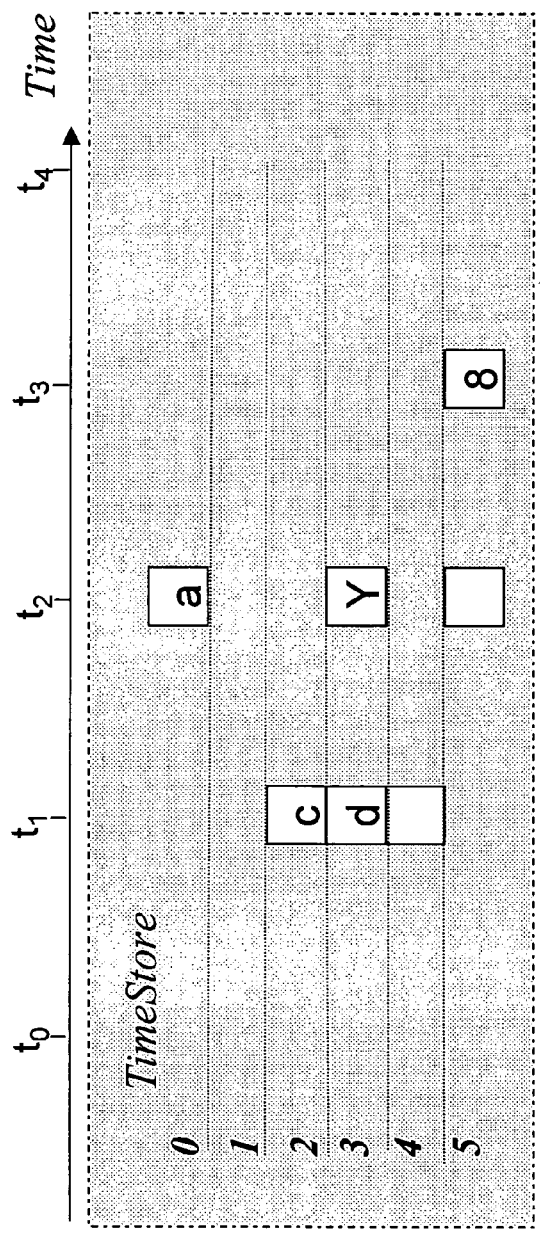

FIGS. 7A and 7B provide another illustrative example of the operation of a current store and a time store for a given data store. FIG. 7A shows the contents of the current store, and FIG. 7B shows the contents of the time store associated with the current store of FIG. 7A. A timeline is drawn at the top of each FIGURE to indicate an initial time t0, a first write time t1, a second write time t2, a third write time t3 and a final time t4. The numbers 0-5 appearing to the left side of FIGS. 7A and 7B identify six blocks of the data store. As mentioned, the data store can consist of any number of blocks or other units of storage. Additionally, the data store can be implemented as any type of resource for storing digital data including a virtual disk, a logical disk, a physical disk, and the like.

The data that is stored at each point in time is enclosed in a solid box. Each of blocks 0-6 of the current store have a corresponding block in the time store. At the time a write request is directed to a block, the data that is written is enclosed in a dashed block appearing adjacent the corresponding block of the current store in FIG. A. This represents data that is pending its transfer to the current store at the completion of the copy-on-write command.

In operation, at for example time t0, data a, b, c, and d are present in each of current store blocks 0-3 respectively. Blocks 4 and 5 do not contain any data at this time. Additionally, the time store does not contain any data because write requests for blocks 0-5 have not yet been directed to the current store. At time t1, data X, Y, and Z are written to blocks 2-4 respectively. A copy-on-write operation is performed on each of blocks 2-4 and the old data appearing in those blocks is read from the current store and written to the time store, i.e., data c, d, and an empty block are written to blocks 2-4 of the time store respectively. As shown in the current store at time t2, the newly written data appears in blocks 2-4 following completion of the write operation at time t1. However, a second write operation is performed at time t2 when data 7, 9, and 8 are written to blocks 0, 3, and 5 respectively. Again, a copy-on-write is performed and, as a result, old data a, Y, and an empty block are written to blocks 0, 3, and 5 respectively. At time t3, a third write operation is performed and data Q is written to block 5. The original data 8 that was previously written to block 5 at time t2 is read and written to block 5 of the corresponding time store. The new data Q is written to block 5 at time t3 and, as a result, the data Q appears in block five of the current store at time t4. Provided that a write operation is not performed at time t4, the time store will remain empty at time t4.

Figure 8:
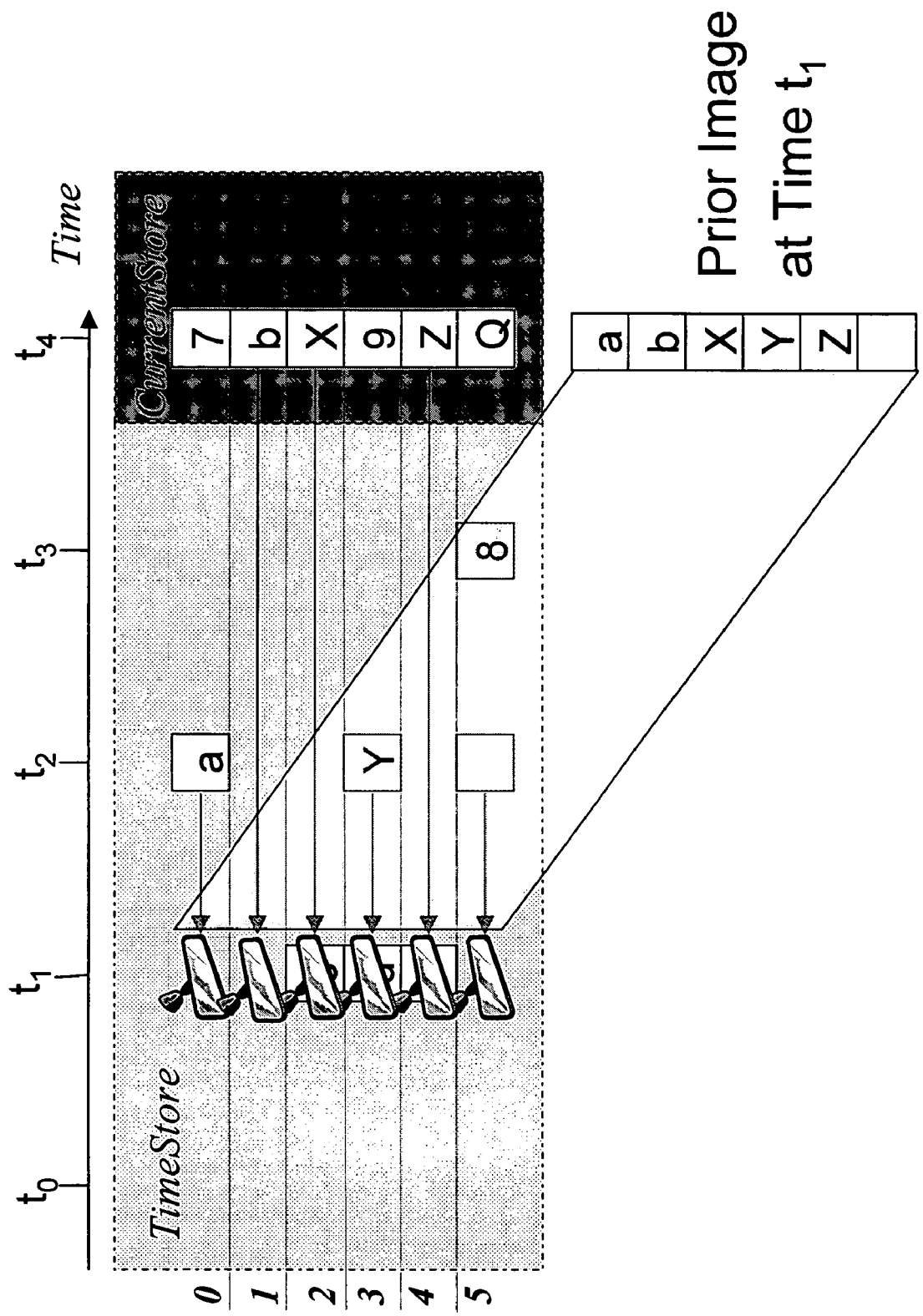
FIG. 8 is a table depicting the generation of a prior image of a data store according to an embodiment of the invention.

The time store of FIG. 8 is based upon the sequence of copy-on-write operations performed to the data store as shown in FIGS. 7A and 7B. FIG. 8 demonstrates how, at request time of t4, a prior image of the current store can be generated for recovery of an image representative of the data store at recovery time t1. Because no write operations were performed on blocks 0, 1, and 5, at either time t0 or time t1, blocks 0, 1, and 5 of the prior image are comprised of data from the current store. Data from the time store is used for the prior image of blocks 3, 4, and 5 at time t1 because data was written to blocks 3, 4, and 5 at time t1. Thus, the prior image of the data store for time t1 does not reflect the result of changes to the current store occurring after time t1.

Figure 9:
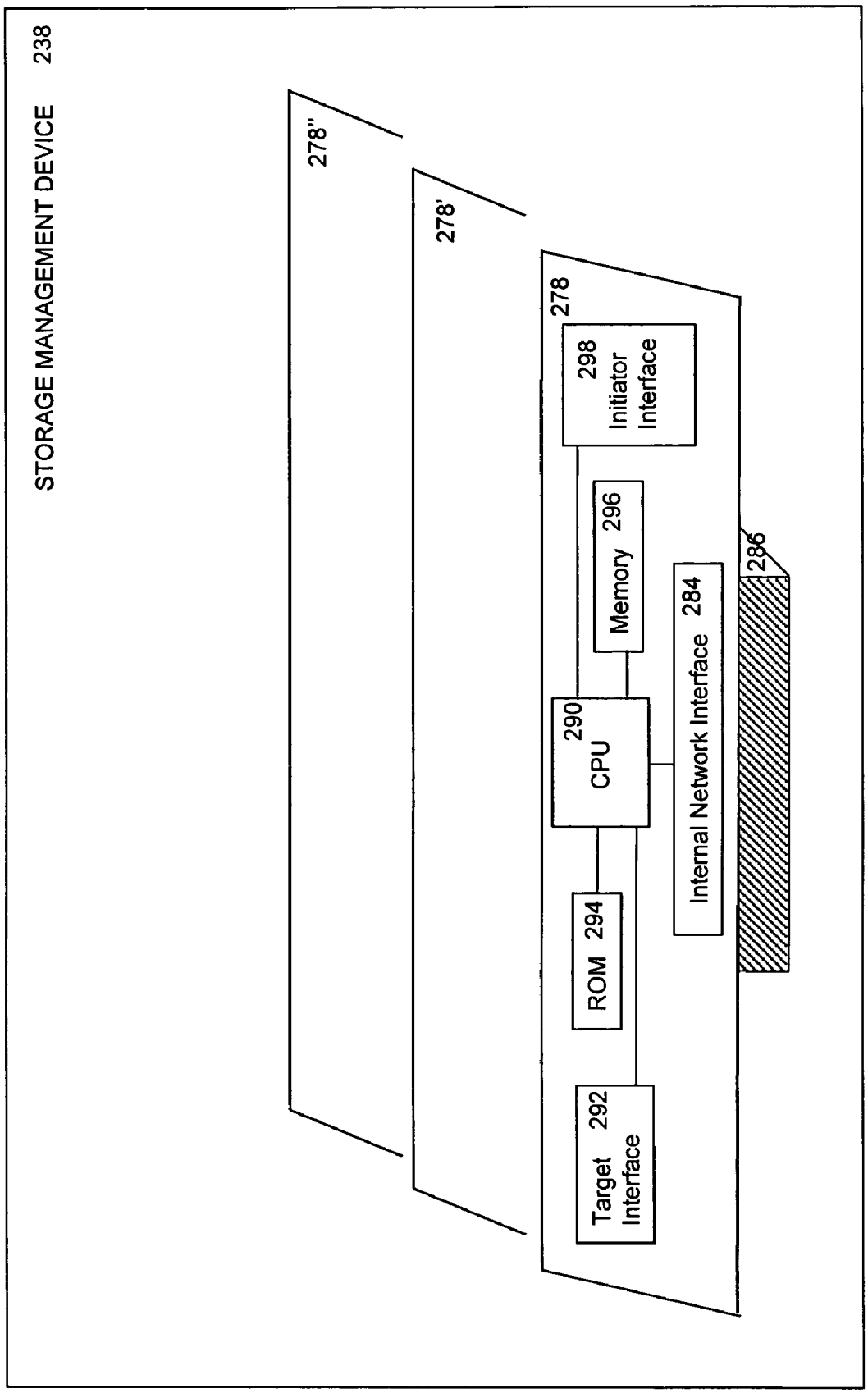
FIG. 9 is a block diagram of a processor module according to an embodiment of the invention.

Referring now to FIG. 9, in one embodiment, a storage management device 238 includes one or more processor modules 278, 278', 278", generally 278. There can be any number of processor modules 278, although three are shown for demonstrative purposes in the FIGURE.

Each processor module 178 includes a CPU 290 that is in communication with each of a target interface 292, a ROM 294, a memory 296, and an initiator interface 298. The CPU 290 can be implemented in one or more integrated circuits, and can include other "glue" logic (not shown) for interface with other integrated circuits, such as bus interfaces, clocks, and communications interfaces. The CPU 290 implements software that is provided in the ROM 294 and also software in memory 296, which software can be accessed, for example, over the internal network interface 284 or in the physical store 36.

The CPU 290 is also in communication with an internal network interface 284 that connects the processor module 278 to an internal network 286, which network allows the processor modules 278 to one another. The internal network 286 can be implemented as one or more actual networks, and can be any sort of network with sufficient capacity to allow communication of both control information and data. The internal network 286 can include a shared serial or parallel bus, or some combination. The internal network can be or include any type of physical network that implements remote direct memory modeled interfaces such as InfiniBand, Ethernet, Fibre Channel, SCSI, and the like. In one embodiment, the interface is a Direct Access Provider Library ("DAPL").

In one embodiment, the processor modules 278 plug into a backplane that implements the connections for the internal network 286. In one implementation, one or more sets of processor modules 278 are rack mounted within the storage management device 238 and the internal network 286 also connects each rack to the other racks within the storage management device 238. The distributed processing implemented in the storage management device 238 creates a system whose size (e.g., memory capacity, processing speed, etc.) can easily be scaled up or down to fit the desired capacity.

The target interface 292 provides an interface that allows the processor module 278 to present itself as one or more target data store devices. For example, if the target interface 292 is a Fibre Channel interface, the target interface 292 allows the processor module 278 to present one or more Fibre Channel devices to the host (not shown). The target interface 292 can implement any suitable networking communication or data storage protocol. The target interface 292 can be implemented with one or more integrated circuits that preferably have direct memory access to portions of the memory 296 for storage of data received and data to be transmitted. The target interface 292 typically will require initialization and programming by the CPU 290.

The initiator interface 298 provides an interface that allows the processor module 278 to present itself as one or more hosts for communication with physical data storage. For example, if the initiator interface 298 is a Fibre Channel interface, the initiator interface 298 allows the processor module 278 to communicate with one or more physical storage devices over a Fibre Channel interface. The initiator interface 298 can implement any suitable networking communication or data storage protocol. The initiator interface 298 can be implemented with one or more integrated circuits that preferably have direct memory access to portions of the memory 296 for storage of data received and data to be transmitted.

The processor modules 278 can be implemented in a fault tolerant configuration wherein two processor modules 278 are each responsible for responding to I/O requests directed to the same units of storage. In a version of this embodiment, fault tolerance can be further improved by sharing responsibility for I/O requests for units of storage comprising a single physical or logical device (or volume) to multiple pairs of processor modules 278. For example, first and second processor modules 278 can be given responsibility for blocks 100 and 200 of current store A and third and fourth processor modules 278 can be given responsibility for blocks 300-500 of current store A. Fault tolerance can be further improved by locating processor modules 278 that perform the same tasks in separate racks.

Figure 10:
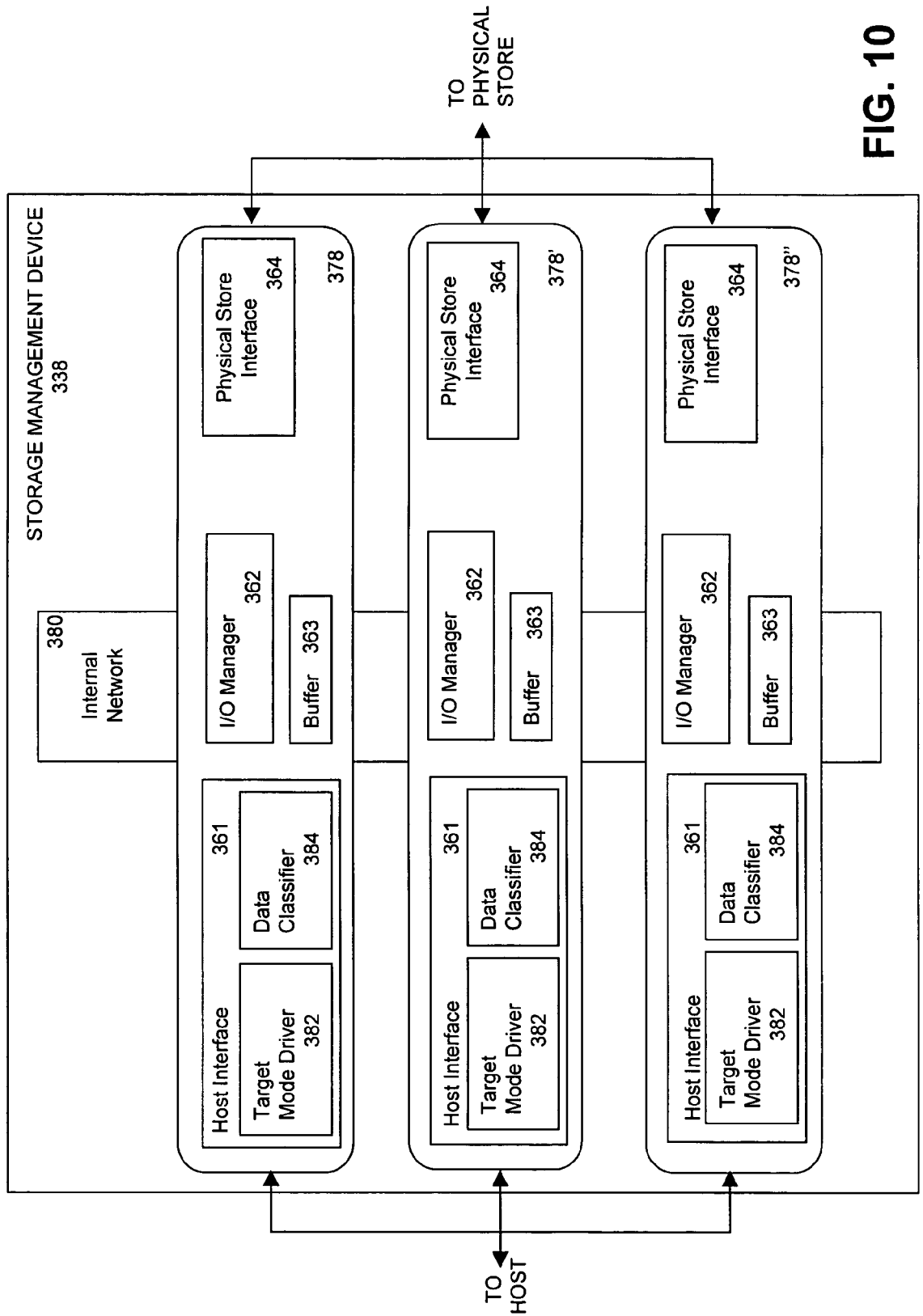
FIG. 10 is a block diagram depicting further details of a storage management device according to an embodiment of the invention.

Referring now to FIG. 10, in a functional depiction of the system elements, again, three processor modules 378, 378', 378", generally 378, are shown in a storage management device 338. The number of modules 378 is (again) merely illustrative, and the quantity of processor modules 378 can be increased or decreased for such considerations as scalability, performance, and cost. The functional elements shown on each processor module 378 can be implemented with hardware and or software; in general, both are used to implement each of these elements.

Each processor module 378 includes a host interface 361 for communicating with a host. The host interface 361 includes a target mode driver 382, which includes the target interface 292 (FIG. 9) and software for communicating with the target interface 292. Functionally, the target mode driver 382 communicates with the host 34. As a result, the target mode driver 382 receives and responds to incoming I/O requests from host 34. In response to read requests, for example, the target mode driver 382 can communicate to the host 34 the requested data. In response to write requests, the target mode driver 182 separates each request into the associated control information and data payload. In one embodiment, the I/O requests are separated into the data payload and a control packet by the host interface 361. The data payload will ultimately be communicated over the internal network to the appropriate physical store interface, as directed by an I/O manager 362. Preferably, the data payload is communicated by hardware direct memory access, without need for software processing. In one embodiment, the control information and the data payload are transmitted via the internal network 180 to other components in the processor module 378 and/or to other processor modules 378.

The host interface 361 also includes a data classifier 384. The data classifier 384 receives the I/O requests from the target mode driver 382, and identifies the appropriate processor module 378 to respond, and forwards this information to the I/O Manager 362.

The data classifier 384 classifies the control information by comparing the incoming I/O requests with the subscription requests generated by the I/O managers 362. In one embodiment, the data classifier 384 determines a process group, storage device identifier (e.g., a logical unit), a unit of storage identifier, and a length for each I/O request. This information, along with the I/O request type, e.g., read or write, is passed to the I/O manager 362 along with a time-stamp. In order to allow for processing a large volume of I/O requests, buffers 363 temporarily store these information packets from the data classifier 384 as they are transmitted to the respective I/O manager 362.

Once the I/O manager 362 receives the control information, it orders and manages the I/O requests and forwards the appropriate instructions to the physical store interface 364. The I/O manager 362 processes control information, and monitors and indexes the flow of information within the storage management device 338. For example, the I/O manager also monitors and indexes the flow of information to and from the other processing modules, and the host interface 361 and the physical store 364. The I/O manager 362 also manages the I/O and insures that modified units of storage are saved and accessible for future reference in the creation of prior images. In addition, the I/O manager 362 tracks the performance (e.g., response time) of the storage management device 338 in responding to I/O requests from the host 34.

The I/O manager 362 also implements various optimization routines in order to provide the host with an efficient response time to I/O requests. For example, because the storage management device can be employed in very large storage systems 30, including storage systems with terabytes of storage capacity, optimization of the copy-on-write command may be desirable. A copy-on-write command can require at least two sequential operations prior to writing the new data to a target storage address: (a) reading existing data from the target storage address and (b) writing the existing data to a new storage address. In one embodiment, the storage management device implements, either alone or in combination, certain optimizations. These optimizations generally fall into one of five categories: (i) aggregation; (ii) spanning; (iii) redundant write; (iv) reordering; and (iv) live storage. Each of these optimizations allows for more efficient processing, particularly of the copy-on-write operations.

1. Aggregation. The first optimization is aggregation. The storage management device 338 aggregates separate copy-on-write commands for sequential units of storage (e.g., units of storage in adjacent blocks) and performs the operations in a single copy-on-write command. This can be useful because the extra overhead associated with the multiple physical disk reads and writes of each block is eliminated when adjacent blocks are operated on as a group.

2. Spanning. The aggregation optimization can be extended further by combining separate copy-on-write commands directed to units of storage that are non-sequential but in close proximity to one another into a single copy-on-write command that spans, in addition to all the targeted units of storage, all the units of storage that are located in the span. For example, where five units of storage 100, 200, 300, 400, and 500 are located sequentially to one another in the order shown, copy-on-write commands directed to blocks 100, 300 and 500 can instead result in a single copy-on-write command directed to blocks 100-500 inclusive. Although extra data is read and operated on, a spanned block that included extra data can still be significantly faster than 3 separate disk operations.

3. Redundant Write. A redundant write optimization can be implemented by identifying a first unit of storage that is likely to be the target of a host write request. Data written to a first block is also written to a second block. An index tracks the address of each unit of storage. Instead of implementing copy-on-write, then, the next write command to that block results in one of the two blocks being overwritten. The unaffected block can then serve as the historical copy of that block.

4. Reordering. With the reordering optimization, incoming I/O requests are reordered so as to maximize the benefits of one or more of the other optimization protocols such as the aggregation protocol, the spanning protocol, the redundant write protocol, and the like.

5. Live Storage. In some instances, significant efficiencies can be gained by storing data in memory rather than in physical storage. For example, if certain blocks have a high volume of I/O requests (e.g., they are updated frequently), many read/write operations can be saved by keeping the data in memory. In one embodiment, the memory is memory 296 (FIG. 9) located in the processor module 378.

Buffer 363 stores data payloads and control information that is being processed within the storage management device 338. Data received by the target mode driver 382, for example, is stored in the buffer 363 until it is communicated to a physical store 36 by the physical store interface 364 or to another processor module 378 via the internal network 380. The buffer 363 includes the memory 296 (FIG. 9) which is allocated in such a way as to allow the various devices to communicate data without software processing of the data.

The physical store interface 364 communicates with the physical store 36 and the I/O manager 362 and the host interface 361. In response to read requests for example, the physical store interface 364 retrieves data stored on the physical store 38, which data is ultimately provided to the host interface 361 for communication to the host 34. For write requests, the physical store interface 364 forwards the data payload to target units of storage of the physical store 36.

Figure 11:
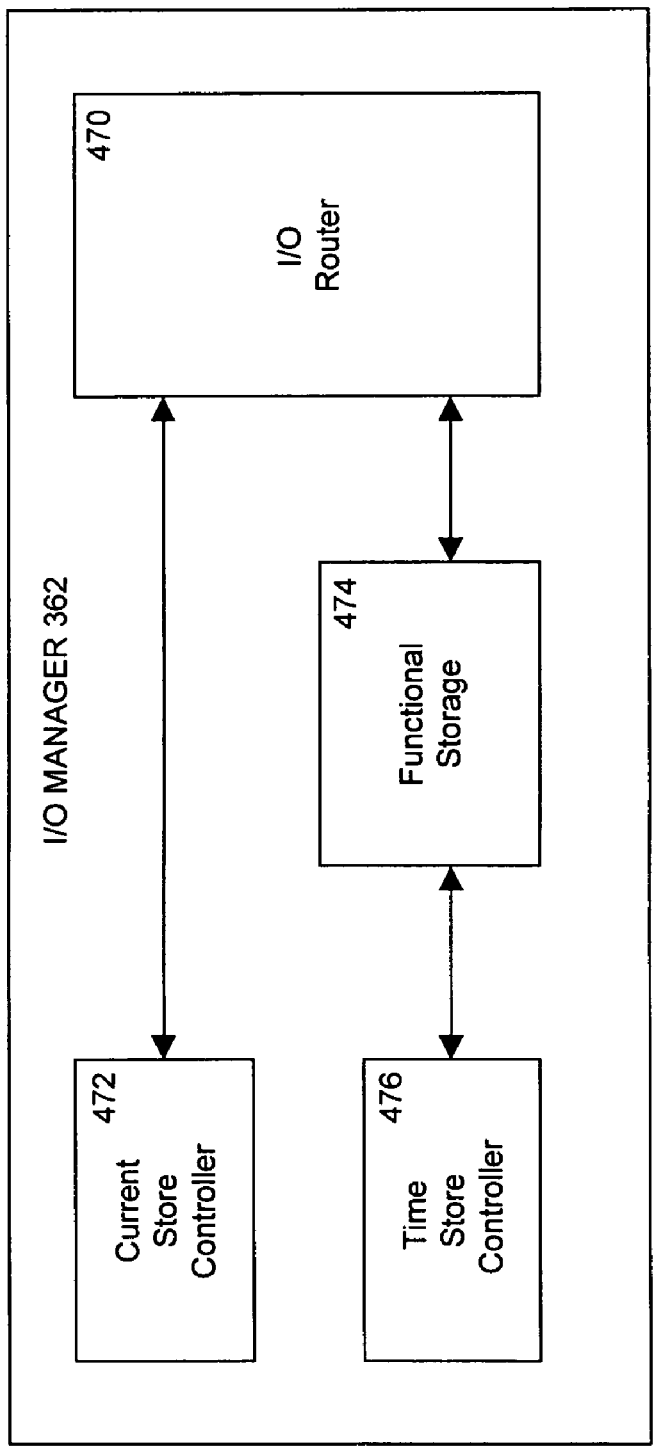
FIG. 11 is a block diagram of an I/O manager according to an embodiment of the invention.

Referring now to FIG. 11, each processor module 378 (FIG. 10) is responsible for I/O requests made with reference to specific portions of a data store. Each I/O manager 362 is responsible for managing and fulfilling I/O requests for the portions of the data store to which its processing module is assigned. In one embodiment, each I/O managers 362 is assigned a contiguous set of blocks of the data store, for example, blocks 100-500 of data store A. Each processor module 378 can employ multiple I/O managers 362. Assignment of the I/O manager 362 to the portions of the data store to which it is responsible takes place by way of a subscription protocol.

Each I/O manager 362 can be responsible for multiple current stores and multiple time stores, which are managed by the current store controller 472 and the functional storage module 474. In one embodiment, the storage management device 338 maintains a database that associates each I/O manager 362 with the contiguous set of blocks that are assigned to the respective I/O manager 362. The data classifiers 384 associated with an I/O manager 362 employ the database to ensure that each I/O manager only performs tasks associated with the blocks assigned to it. In one embodiment, this approach allows a subset of the total number of I/O managers 362 in the storage management device 338 to service a single time store while other I/O manager 362 subsets can service additional time stores. This approach is also scalable because increasing the quantity of I/O managers 362 will increase the quantity of time stores that the storage management device 338 can efficiently service. Also, the approach can be used with a single physical store 36 that comprises multiple time stores and multiple current stores. Because this approach uniquely identifies each data store, only a limited amount of additional information is required to associate each I/O manager 362 with specific unit(s) of storage. In one embodiment, the data store block number, the time store block number, and the time stamp are the only additional information that is required.

In one embodiment, the I/O manager maintains a series of control information tables that each correspond to a specific window of time. For example, all I/O processed by an I/O manager 362 between 9:00 and 9:05 can be stored in a single table, while I/O that occurred between 9:05 and 9:10 is stored in another table. In a version of this embodiment, the tables are a fixed size. A fixed table size allows the processing time of each query to a table to be readily determined because all the tables are full except the table that is currently in use. Thus, the processing time is identical for all tables, but the current table. Although the table size is fixed, the time period covered by each table is variable as a result of the variable frequency of write commands and the variable size of the target units of storage associated with each command. For example, a table that is limited to 600,000 entries will fill in 9,000 units of time if, on average, the associated I/O manager 362 processes 200,000 write commands every 3000 units of time. However, the same size table will fill in 3000 units of time if the associated I/O manager 362 receives 200,000 write commands every 1000 units of time. In a version of this embodiment, the table comprises a data store block number, a time store block number, and a timestamp that indicates when the associated copy-on-write operation was performed.

When a table is filled, the I/O manager 362 does three things:

1) The I/O manager 362 creates a new table for new incoming write operations.

2) The I/O manager 362 creates an entry in a separate table (e.g., a master table) that describes and indexes these control information tables. The master table contains the table name and the time range that the table covers, i.e., from the creation time of the table to the time that the last entry was recorded in the table. In one embodiment, the master table is local to the I/O manager 362 with which it is associated.

3) The I/O manager 362 creates a bitmap representing all of the I/O in a given table. This bitmap has a bit for a given block range. The bitmap can be tuned to adjust the block ranges represented by each bit; therefore, in one embodiment, bit 0 represents blocks 0-15, bit 2 represents block 16-32, etc. The amount of data each bit represents is referred to as the region size.

The region size is also tunable. Thus, the chance for a false positive on a bit is reduced the closer the region size is to either the average I/O request size or the minimum I/O request size. In one embodiment, the minimum I/O request size is 1 sector or 512 bytes. In operation, if the region size is 128 kilobytes, the first bit would be set if the user wrote data to blocks 2-10. However, if the bitmap was later used to determine whether block 85 is referenced in the underlying data, the bitmap would provide a false positive indication.

As the region size is reduced the quantity of false positives is reduced, and may in fact be reduced to zero. More memory and disk space are required, however, to store the bit map when the region size is reduced. Conversely, as the region size is increased, there is an increase in the quantity of false positives that occur, however, the memory requirements of the bit map are reduced. In one embodiment, each I/O manager selects a region size that dynamically balances the rate of false positives and the size of the bitmap.

In one embodiment, the impact of the operations required by the I/O manager to close or "seal" a table when it reaches capacity and to move to a new table are minimized because the table transfer is performed asynchronously relative to the continuing I/O stream.

When a specific recovery time is requested for the generation of a time based data store (for example data store B), three general levels of operations must be performed by the I/O manager 362.

1) The I/O manager 362 first identifies the tables that are involved. If the user requests a recovery time of T-500, the I/O manager 362 scans the master table for the control information tables that include I/O operations that occurred between T-500 and the request time. The I/O manager then retrieves the bitmaps for each of the control information tables that include the qualifying I/O operations.

2) The I/O manager 362 then creates a master bitmap by OR'ing together all of the bitmaps that were retrieved and saves the individual bitmaps and the master bitmap. Once the OR operation is complete, the master bitmap can be used to evaluate a substantial percentage of potential read requests to determine whether the requested blocks were involved in prior write operation (i.e., between T-500 and the request time). If a block was not involved in a write operation at that time, data from the current store will be used for the block. Retrieval and presentation of data from the current store is a substantially real time operation. If the region bit is set in the master bitmap, the I/O manager 362 begins scanning the individual bitmaps from the oldest to the newest to determine which bit is set for the region and then scans the bitmap's underlying table for the location of the I/O operation in the time store. These operations are slower than the retrieval of data from the current store, but they continue to proceed through the system.

3) The I/O manager 362 begin creating region maps whereby copies of the blocks described in each individual control information table are stored in memory. When this operation is complete, the time delay for a read request that must go to the time store for data is reduced because the request is redirected to the memory and rarely (if ever) requires any extra table scanning.

The response time of the storage management device 38 is reduced by the preceding approach because the I/O manager 362 begins servicing requests when the first step is complete. In most applications, the current store will provide the majority of the data required for the generation of a time store because, most often, the time store will be generated at a relatively recent point in time, for example, 1 minute, 1 hour, 1 day. The amount of data typically changed in those time segments is small when compared to the entire data store. Each master table can contain 500,000 to 5,000,000 records, yet each table can be searched in a fixed time. Thus, a master table of only a few thousand entries can be used in an application that supports a physical store 36 of 2 terabytes.

Figure 12:
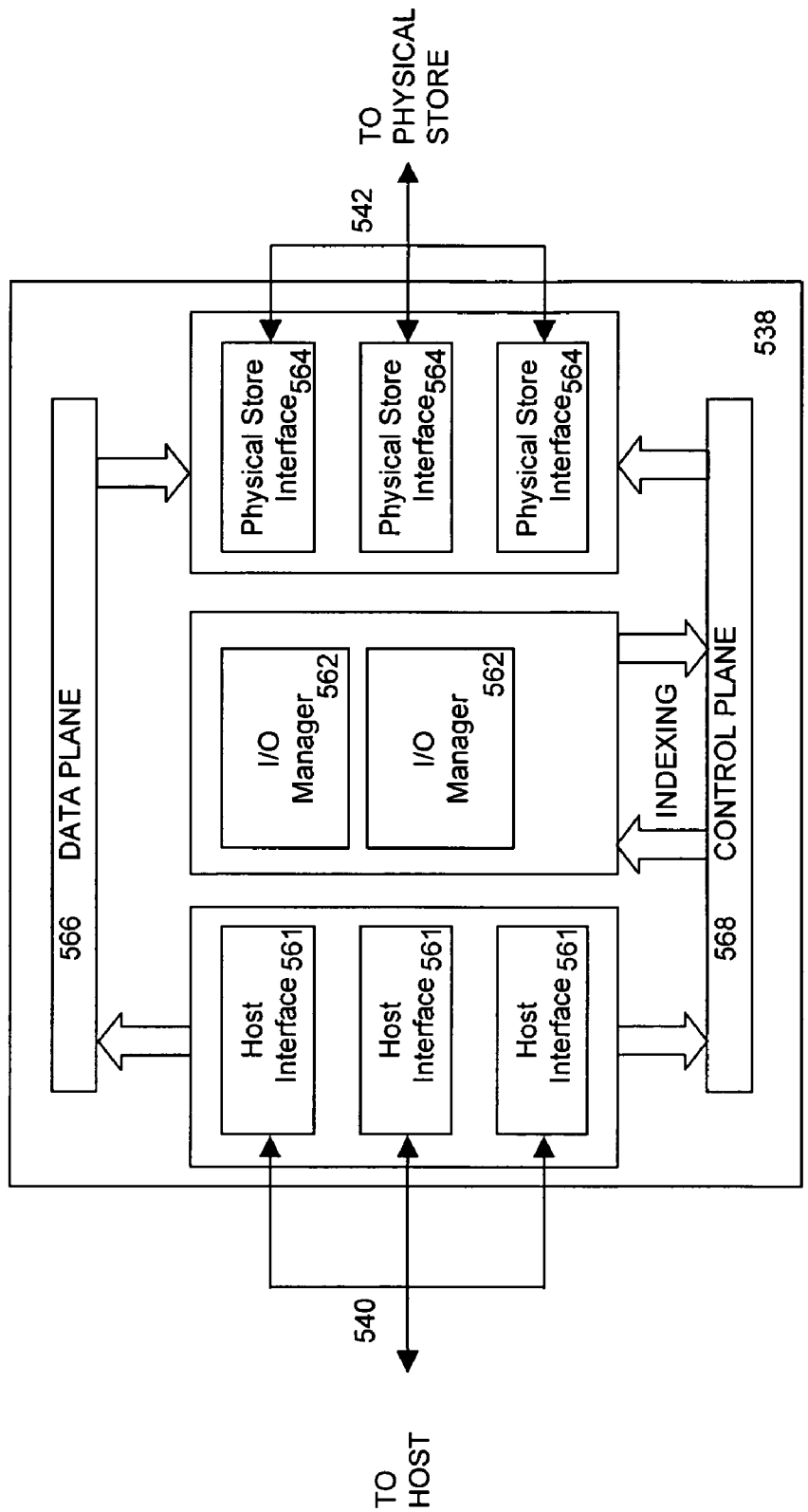
FIG. 12 is a block diagram of a storage management device according to an embodiment of the invention.

Referring to FIG. 11, the current store controller 472 processes requests directed to the device/unit of storage combinations to which the current store controller 472 is subscribed. Each current store controller 472 receives the resulting control information transmitted from a host interface 361 (FIG. 10) to the I/O manager 462 over a control plane 568 (FIG. 12). The current store controller 472 creates work orders based on this control information to insure that the data associated with the control request is written to a logical unit and that the old data that presently appears at the target location is copied and saved elsewhere by the storage management device 538.

Similarly, the time store controller 476 processes requests directed to the device/unit of storage combinations to which the time store controller 476 is subscribed. Each subscription is registered with the data classifier 384 of the processor modules 378.

The I/O manager 362 also includes an I/O router 470. The I/O router 470 is the software module responsible for moving the data, as directed by the current store controller 372 and the time store controller 376.

Although one of each of the I/O router 470, a current store controller 472, functional storage 474, and a time store controller 476 is shown, the I/O manager 362 can include one or more of each of these. Moreover, these elements can communicate in other configurations than the configuration shown in FIG. 11. For example, in one embodiment, the I/O manager 462 includes a plurality of time store controllers 476.

Referring now to FIG. 12, in another embodiment and a more abstract representation, the storage management device 538 includes the data plane 566 and a control plane 568 used for communication of the multiple modules between each other. The storage management device 538 includes multiple host interfaces 561, I/O managers 562 and physical store interfaces 564. Although these components are, as shown in earlier FIGURES, each located on a particular processor module, they can be viewed together as collections of these components working together to share the load, both for efficiency and fault tolerance.

The host interfaces 561 and physical store interfaces 564 communicate data to each other on a data plane 566, which as described above is implemented with direct memory access and the internal network 380 (FIG. 10). Control information (e.g., control packets, meta-data packets) is communicated on the control plane 568 between the host interfaces 561 and the I/O managers 562, and between the I/O managers 562 and the physical store interfaces 564. The control plane 568 is implemented with inter-processor communication mechanisms, and use of the internal network 380 (FIG. 10). The data payload is communicated between the host interface 561 and the physical store interface 564 over the data plane 566.

The optimization operations described above are accomplished, in part, because of a queue system employed by the storage management device 338. The queue system organizes the control information (e.g., control packets, meta data packets) that are processed by the I/O managers 362. The control information is first subject to an incoming queue in which the I/O manager 362 queues the control information in the order that it is received.

In one embodiment, control packets are joined, reordered, and/or strategically delayed in order to process the packets more efficiently. Referring again to FIG. 10, the I/O manager 362 identifies and tracks idempotent groups of control packets, that is, groups of control packets that are independent of one another. Generally, the idempotent groups are the groups that can be processed more efficiently than other packet groups, e.g., idempotent groups are processed more quickly. If for example, at time T0 a first control packet directed to blocks 0-15 arrives, and at time T5, a second control packet directed to blocks 8-31 arrives, the I/O manager 362 includes all the operations from T0 to T4 in one idempotent group, and begins another group at time T5 (provided that no other control packets overlap between T0 and T5). In this example, the processing, grouping, and execution order are selected to prevent the T5 operation from occurring prior to the T0 operation. If for example, the T5 operation were performed first, the T0 operation would include part of T5's payload in its before image (i.e., blocks 8-15). Further, the T5 operation would be missing the data from the T0 operation in it's before image although the data existed at time T1.

The storage management device 338 creates many opportunities for generating customized control packet groups that improve processing efficiency because, for example, operations can be split into "worker groups", where each worker group can operate in a threaded, independent by simultaneous fashion. A determination that certain blocks are not idempotent as described above, forces the I/O manager 362 to ensure that all the blocks referencing 0-32 occur in the same worker group as the T0 and T5 operations, but operations involving other very large groups of blocks can still reordered. Therefore, the I/O managers 362 are constantly identifying, analyzing, and managing idempotent relationships on multiple queues using advanced queuing theory.

The system allows the user to create a new dynamic or static data store B, which is a representation of the main data store A but at a previous point in time, for example, T-500. The target mode driver 382 creates target device representations on the first communication link 40, which allows the host 34 to issue commands to the new data store B. The I/O manager 362 uses functional storage 474 to create a map of all blocks which can not be satisfied for the data store B via current store A, i.e., the blocks have been overwritten in current store A since the recovery time T-500. The map continues to be updated as a result of the continuing stream of I/O which is directed to the main data store A. For example, each time the user modifies a block of data store A, the targeted block in current store A no longer contains the same data as it did before time T-500. The map incorporates the location where the newly targeted block gets copied to in time store A. As a result, I/O requests directed to data store B locate the correct block contents. Additionally, this entire process must be synchronized to ensure that updates to the current store A, time store A are accurately reflected in data store B's map in order to prevent I/O requests to data store B from identifying the wrong block as the source of data. For example, when a new block is written to data store A, the map is updated with the location in the time store of the prior contents of data store A. The storage management device 538 employs methods to ensure that later in time I/O requests directed to data store B locate the correct data.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A storage management system for backing up a plurality of units of storage, the storage management system comprising:
    at least one current store, separate from the plurality of units of storage, representing a current state of at least one of the plurality of units of storage; and
    at least one time store, separate from the plurality of units of storage and the at least one current store, the at least one time store storing old data copied from the at least one current store and associated timestamps;
    wherein the storage management system automatically records information associated with all write commands directed to the plurality of units of storage within the at least one time store, each write command comprising an instruction to overwrite at least one of the plurality of units of storage with new data;
    wherein the storage management system copies, prior to overwriting the at least one unit of storage, old data in the at least one current store, representing old data present at the at least one unit of storage, into the at least one time store, wherein the old data is timestamped in the at least one time store, thereby continuously indexing by timestamp in the at least one time store old data to be overwritten with new data prior to execution of each write command;
    wherein the storage management system is further configured to identify old data that were present in a specified portion of the plurality of units of storage at a specified time prior to being overwritten based at least in part on a timestamp corresponding to the specified time and associated with the old data in the at least one time store, without the use of a snapshot containing the old data at the specified time;
    wherein the at least one time store does not store the new data.

2. The storage management system of claim 1, wherein the plurality of units of storage comprises one or more physical storage devices on which data of the plurality of units of storage is stored.

3. The storage management system of claim 2, wherein an address for accessing the plurality of units of storage comprises a device identifier and a location identifier.

4. The storage management system of claim 3, wherein the device identifier identifies a physical storage device.

5. The storage management system of claim 3, wherein the device identifier identifies a logical device.

6. The storage management system of claim 1, wherein data of the plurality of units of storage can be accessed by specifying an address and a given time, wherein the given time is specified to allow data retrieved from the address to be the most recent data that was written to the address at or before the given time.

7. The storage management system of claim 6, wherein the given time is explicitly specified in a request to access at least one of the plurality of units of storage.

8. The storage management system of claim 6, wherein the given time is specified in a command to the plurality of units of storage separate from a request to read a unit of storage.

9. The storage management system of claim 6, wherein the storage management system creates a virtual device, wherein the given time is specified when the virtual device is created, and is applied when the virtual device is accessed.

10. The storage management system of claim 9, wherein new data is written to the virtual device without overwriting data that was written to the plurality of units of storage after the given time specified when the virtual device was created.

11. The storage management system of claim 6, wherein a command to the plurality of units of storage specifies that the given time is implicitly a current time.

12. The storage management system of claim 6, wherein the given time is specified relative to a current time.

13. The storage management system of claim 1, wherein at least some of the plurality of units of storage are blocks.

14. The storage management system of claim 1, wherein the at least one current store maintains a current mirror copy of data stored in the plurality of units of storage, and wherein the at least one time store contains the old data and a timestamped record of the old data.

15. The storage management system of claim 14, wherein, after the old data is copied to the at least one time store, the at least one unit of storage is overwritten with the new data, and the current mirror copy in the at least one current store is updated with the new data.

16. A method for backing up a plurality of units of storage, the method comprising:
    recording, in at least one time store, information associated with all write commands directed to the plurality of units of storage, wherein each write command comprises an instruction to overwrite at least one of the plurality of units of storage with new data;
    copying, prior to overwriting the at least one unit of storage, old data in at least one current store, representing old data present at the at least one unit of storage, into the at least one time store, wherein the old data is timestamped in the at least one time store, thereby continuously indexing by timestamp in the at least one time store old data to be overwritten with new data prior to execution of each write command, wherein the at least one time store and the at least one current store are separate from the plurality of units of storage and from each other; and
    identifying old data that were present in a specified portion of the plurality of units of storage at a specified time prior to being overwritten based at least in part on a timestamp corresponding to the specified time and associated with the old data in the at least one time store, without the use of a snapshot that includes the old data at the specified time, wherein the at least one time store does not store the new data.

17. The method of claim 16, wherein an address for accessing the plurality of units of storage comprises a device identifier and a location identifier.

18. The method of claim 17, wherein the storage management system creates a virtual device, wherein the time is specified when the virtual device is created, and is applied when the virtual device is accessed.

19. The method of claim 18, further comprising writing data to the virtual storage device.

20. The method of claim 16, wherein data of the plurality of units of storage can be accessed by specifying an address and a time, wherein the time is specified to allow the data retrieved from the address to be the most recent data that was written to the address at or before the time.

21. The method of claim 20, wherein the specified time is explicitly specified in a request to access a unit of storage.

22. The method of claim 16, wherein specifying the time comprises specifying the time relative to a current time.

23. The method of claim 16, further comprising:
maintaining, in the at least one current store, a current mirror copy of the content of the plurality of units of storage; and
overwriting the at least one unit of storage with the new data and updating the current mirror copy in the current store with the new data, wherein the overwriting and the updating occur after the old data is copied to the time store.

24. An apparatus for storing data, the apparatus comprising:
a storage appliance that interfaces with a computer;
one or more physical storage devices that interface with the storage appliance, the one or more physical storage devices having a plurality of storage units, each such physical storage device controlled by the storage appliance;
wherein the storage appliance comprises at least one current store and at least one time store, the at least one current store and the at least one time store being separate from each other and from the plurality of storage units, the at least one current store maintaining a current mirror copy of digital content in the one or more physical storage devices, wherein before a storage unit in the plurality of storage units is overwritten by write command with new data, old data present at the storage unit is copied from the current store and timestamped and stored in the at least one time store, thereby continuously indexing by timestamp in the at least one time store old data to be overwritten with new data prior to execution of each write command; and
wherein the storage appliance is further configured to identify old data that were present in a specified portion of the plurality of storage units during a specified time prior to being overwritten based at least in part on a timestamp corresponding to the specified time and associated with the old data in the at least one time store, without the use of a snapshot that includes the old data at the specified time, wherein the at least one time store does not store the new data.

25. The apparatus of claim 24, wherein data of the plurality of storage units can be accessed by specifying an address and a time, wherein the time is specified to allow data retrieved from the address to be the most recent data that was written to the address at or before the time.

26. A computer readable storage medium storing code to cause a processor to control a plurality of units of storage, the computer readable storage medium comprising:
code adapted to record, in at least one time store, information associated with all write commands issued to the plurality of units of storage, wherein each write command comprises an instruction to overwrite at least one of the plurality of units of storage with new data; and
code adapted to copy, prior to overwriting the at least one unit of storage, old data in at least one current store, representing old data present at the at least one unit of storage, into the at least one time store, wherein the old data is timestamped in the at least one time store, thereby continuously indexing by timestamp in the at least one time store old data to be overwritten with new data prior to execution of each write command, wherein the at least one time store and the at least one current store are separate from the plurality of units of storage and from each other; and
code adapted to identify old data that were present in a specified portion of the plurality of units of storage at a specified time period prior to being overwritten based at least in part on a timestamp corresponding to the specified time and associated with the old data in the at least one time store, without the use of a snapshot that includes the old data at the specified time, wherein the at least one time store does not store the new data.

27. The computer readable storage medium of claim 26, wherein data of the plurality of units of storage can be accessed by specifying an address and a time, wherein the time is specified to allow data retrieved from the address to be the most recent data that was written to the address at or before the time.

28. The computer readable storage medium of claim 26, wherein the specified time period is explicitly specified in a request to access at least one of the plurality of units of storage.

29. The computer readable storage medium of claim 26, further comprising:
code adapted to maintain, in a current store, a current mirror copy of the content of the plurality of units of storage; and
code adapted to overwrite the at least one unit of storage with the new data and update the current mirror copy in the current store with the new data after the old data is copied to the time store.

* * * * *